(12) United States Patent
Kenthapadi et al.

(10) Patent No.: US 10,158,645 B1
(45) Date of Patent: Dec. 18, 2018

(54) PROTECTING AGAINST SPAM AND OVER-REPRESENTATION IN SUBMISSION OF CONFIDENTIAL DATA

(71) Applicant: Microsoft Technology Licensing, LLC, Redmond, WA (US)

(72) Inventors: Krishnaram Kenthapadi, Sunnyvale, CA (US); Ahsan Chudhary, Sunnyvale, CA (US); Stephanie Chou, San Francisco, CA (US); Ryan Wade Sandler, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 15/224,261

(22) Filed: Jul. 29, 2016

(51) Int. Cl.
*H04L 29/06* (2006.01)
*G06N 99/00* (2010.01)

(52) U.S. Cl.
CPC ......... *H04L 63/102* (2013.01); *G06N 99/005* (2013.01); *H04L 63/08* (2013.01); *G06F 2221/2151* (2013.01)

(58) Field of Classification Search
None
See application file for complete search history.

(56) References Cited

U.S. PATENT DOCUMENTS

| | | | |
|---|---|---|---|
| 2013/0179511 A1* | 7/2013 | Stevens | H04L 67/02 709/204 |
| 2015/0046436 A1* | 2/2015 | Li | G06F 17/3053 707/723 |
| 2015/0264084 A1* | 9/2015 | Kashyap | H04L 63/1483 726/22 |
| 2015/0347593 A1* | 12/2015 | Tsai | G06F 17/30867 707/722 |
| 2017/0064090 A1* | 3/2017 | Tamvada | H04M 15/61 |

* cited by examiner

*Primary Examiner* — David Le
(74) *Attorney, Agent, or Firm* — Schwegman Lundberg & Woessner, P.A.

(57) ABSTRACT

In an embodiment, a submission history table is maintained by tracking an identification of each user making a submission of a confidential data value and a timestamp of when the corresponding submission was made. A first confidential data value submission is received from a user having a first identification. Member usage information for the user having the first identification, are retrieved based on the first identification. The submission history table is referenced to determine a length of time since the user having the first identification last made a submission of confidential data. It is determined that the user having the first identification is not permitted to submit confidential information based on the member usage information and the length of time since the user having the first identification last made a submission of confidential data. In response to the determining, the first confidential data value is discarded.

17 Claims, 25 Drawing Sheets

PROTECTING AGAINST SPAM AND OVER-REPRESENTATION IN SUBMISSION OF CONFIDENTIAL DATA

TECHNICAL FIELD

The present disclosure generally relates to computer technology for solving technical challenges in collection and maintenance of confidential data in a computer system. More specifically, the present disclosure relates to protecting against spam and over-representation in submission of confidential data.

BACKGROUND

In various types of computer systems, there may be a need to collect, maintain, and utilize confidential data. In some instances, users may be reluctant to share this confidential information over privacy concerns. These concerns extend not only to pure security concerns, such as concerns over whether third parties such as hackers may gain access to the confidential data, but also to how the computer system itself may utilize the confidential data. With certain types of data, users providing the data may be somewhat comfortable with uses of the data that maintain anonymity, such as the confidential data merely being used to provide broad statistical-based analysis to other users.

One example of such confidential data is salary/compensation information. It may be desirable for a service such as a social networking service to entice its members to provide information about their salary or other work-related compensation in order to provide members with insights as to various metrics regarding salary/compensation, such as an average salary for a particular job type in a particular city. There are technical challenges encountered, however, in ensuring that such confidential information remains confidential and only used for specific purposes, and it can be difficult to convince members to provide such confidential information due to their concerns that these technical challenges may not be met. Additionally, it can be difficult to ensure accuracy and reliability of the confidential data.

BRIEF DESCRIPTION OF THE DRAWINGS

Some embodiments of the technology are illustrated, by way of example and not limitation, in the figures of the accompanying drawings.

DETAILED DESCRIPTION

Overview

The present disclosure describes, among other things, methods, systems, and computer program products. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, an architecture is provided that gathers confidential information from users, tracks the submissions of the confidential information, and maintains and utilizes the confidential information in a secure manner while ensuring that the confidential information is accurate and reliable.

Figure 1:
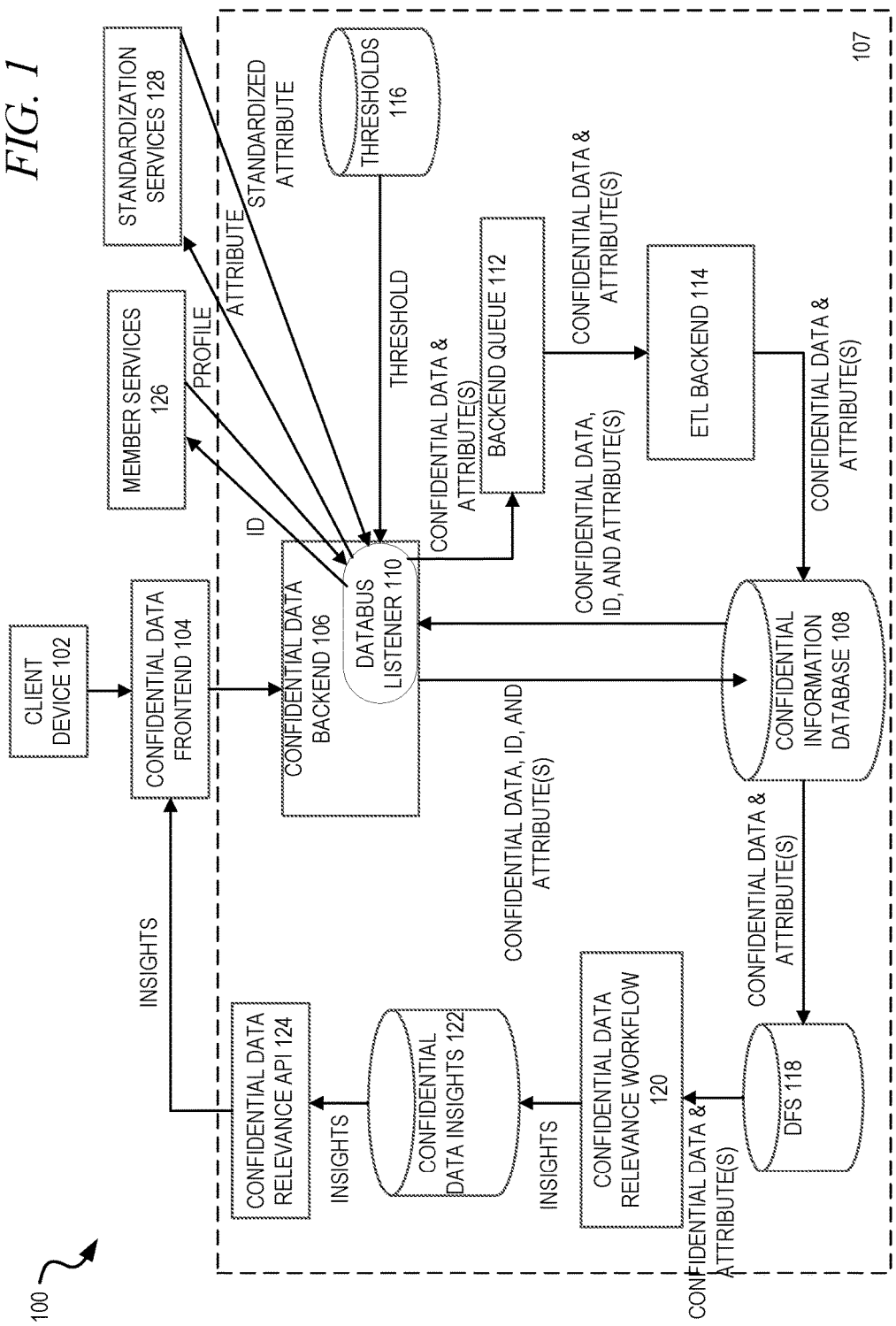
FIG. 1 is a block diagram illustrating a confidential data collection, tracking, and usage system, in accordance with an example embodiment.

FIG. 1 is a block diagram illustrating a confidential data collection, tracking, and usage system 100, in accordance with an example embodiment. A client device 102 may utilize a confidential data frontend 104 to submit confidential information to the confidential data backend 106. In some example embodiments, the confidential data backend 106 is located on a server-side or cloud platform 107 while the confidential data frontend 104 is directly connected or embedded in the client device 102. However, in some example embodiments, the client confidential data frontend 104 is also located on the server-side or cloud platform 107.

There may be various different potential implementations of the confidential data frontend 104, depending upon the type and configuration of the client device 102. In an example embodiment, the confidential data frontend 104 may be a web page that is served to a web browser operating on the client device 102. The web page may include various scripts, such as JavaScript code, in addition to HyperText Markup Language (HTML) and Cascading Style Sheets (CSS) code designed to perform various tasks that will be described in more detail below. The web page may be served in response to the user selecting a link in a previous communication or web page. For example, the link may be displayed in an email communication to the user, or as part of a feed section of a user's social networking service member page. This allows the entity operating the system 100 to selectively target users to request that they submit confidential information. For example, the entity may determine there is a need to obtain more salary information for users from Kansas and then may send out communications to, or cause the social networking service to alter feeds of, users in a manner that allows the users to select the link to launch the confidential data frontend 104.

In another example embodiment, the confidential data frontend 104 may be built into an application installed on the client device 102, such as a stand-alone application running on a smartphone. Again this confidential data frontend 104 is designed to perform various tasks that will be described in more detail below.

One task that the confidential data frontend 104 may be designed to perform is the gathering of confidential data from a user of the client device 102. Another task that the confidential data frontend 104 may be designed to perform is to display insights from confidential data contributed by other users. Due to the reluctance of users to provide certain types of confidential data, in an example embodiment, a user may be encouraged to share confidential information by providing insights based on confidential information received from other users. Information that can be used to identify the other users, however, is not shared while providing these insights. As will be described in more detail, a mechanism to ensure that the contribution of confidential data is tracked is provided.

Once received from the user, the confidential data frontend 104 may transmit the confidential data along with an identification of the user (such as a member identification reflecting the user's account with a social networking service) to the confidential data backend 106. In an example embodiment, this may be performed via, for example, a REST Application Program Interface (API).

The confidential data, along with the identification of the user, may be stored in a submission table by the confidential data backend 106 in the confidential information database 108. In some example embodiments, this submission table may be encrypted in order to ensure security of the information in the submission table. Furthermore, in some example embodiments, the confidential data stored in the submission table may be encrypted using a different key than the identifying information in the submission table. This encryption will be described in more detail below.

In another example embodiment, a random transaction number is generated for each confidential data submission. This random transaction number is stored with the identifying information in one table, and then stored with the confidential data in another table, with each table encrypted separately using a different key. In either this example embodiment or the previous example embodiment, encrypting the identifying information separately from the confidential data (either in one table or in separate tables) provides added security against the possibility that a malicious user could gain access to one or the other. In other words, even if a malicious user gained access to the identifying information by, for example, hacking the encryption used to encrypt the identifying information, that would not allow the malicious user to gain access to the compensation data corresponding to the identifying information, and vice versa. In an example embodiment, the encryption mechanism used is one that is non-deterministic, such that the same information encrypted twice would produce different results in each encryption. In another example embodiment, the transaction number itself is also encrypted, thereby preventing even the act of joining separate tables containing the identifying information and the confidential data.

In an example embodiment, a submission table may also be able to track when submissions were made by users. As such, the submission table may include additional columns such as, for example, a submission identification, an identification of the user who made the submission, an encryption key for the submission, and timestamp information about when the submission was made. The submission table may then be utilized by the confidential data backend 106 to determine, for example, when to share insights from submissions from other users to a particular user. If, for example, the user has not previously submitted confidential data or has not submitted confidential data within some predetermined time period (e.g., within the last year), then the confidential data backend 106 may indicate to the confidential data frontend 104 that it should not share insights from confidential data from other users with this particular user until this particular user submits confidential data (or submits updated confidential data in the case where the particular user had submitted confidential data previously).

There may be other methods for determining eligibility of a user for receiving insights from submissions from other users than those described above. For example, a predicate expressed in terms of one or more attributes may need to be satisfied in order to receive the insights, such as particular demographic or profile-based attributes. These attributes can include any such attribute, from location to title, to level of skill, to social networking service activities or status (e.g., about to transition from being an active member to an inactive member) to transactional attributes (e.g., purchased a premium subscription).

Additionally, any combination of the above factors can be used to determine whether the user is eligible for receiving insights from submissions from other users.

As will be described in more detail below, in an example embodiment, a machine learning algorithm may be used to determine when a user is eligible to receive insights from confidential data submissions from other users. Specifically, the machine learning algorithm may be used to train an engagement model that uses one or more of the various factors described above as features to generate an engagement score for a particular user. This engagement score may be a representation of the likelihood that a user who is provided with insights from confidential data submissions from other users will engage more with a social networking service, either with or without the user having submitted his or her own confidential data. The engagement score may then be compared with a threshold to determine whether the user should be provided with the insights from confidential data submissions from other users. Alternatively, or in conjunction with this, the engagement score may then also be used to determine users from which to solicit confidential data.

Furthermore, the submission table may also include one or more attributes of the user that made the submission. These attributes may be attributes that can be useful in determining a slice to which the user belongs. Slices will be described in more detail below, but generally involve a segment of users sharing common attributes, such as titles, locations, educational level, and the like. It should be noted that it is not necessary for these attributes to be stored in the submission table. Since an identification of the user is available in the submission table, it may be possible to retrieve the attributes for the user on an as needed basis, such as by querying a social networking service with the user identification when needed.

A databus listener 110 then detects when new confidential data is added to the confidential information database 108 and triggers a workflow to handle the new confidential data. First, it queries a thresholds data store 116 to determine if one or more thresholds for anonymization have been met. Specifically, until a certain number of data points for confidential data have been met, the system 100 will not act upon any particular confidential data data point. As will be described in more detail later, these thresholds may be created on a per-slice basis. Each slice may define a segment of users upon which insights may be gathered based on data points from confidential data submitted by users in the slice. For example, one slice may be users with the title "software engineer" located in the "San Francisco Bay Area." If, for example, the confidential data is compensation information, then it may be determined that in order to gain useful insights into the compensation information for a particular title in a particular region, at least 10 data points (e.g., compensation information of 10 different users) are needed. In this case, the threshold for "software engineer" located in "San Francisco Bay Area" may be set at 10. The databus listener 110 is, therefore, designed to retrieve the confidential data added to the confidential information database 108, retrieve the threshold for the slice corresponding to attributes of the user (as stored, for example, in the submission table in the confidential information database 108 or retrieved at runtime from a social networking service), determine if the new data point(s) cause the threshold for the corresponding slice to be transgressed, and, if so, or if the threshold had already been exceeded, insert the data in a backend queue 112 for extract, transform, and load (ETL) functions.

In an example embodiment, the thresholds data store 116 contains not just the thresholds themselves but also maintains a running count of how many data points have been received for each slice. In other words, the thresholds data store 116 indicates how close the slice is to having enough data points with which to provide insights. The databus listener 110 may reference these counts when making its determination that a newly submitted data point causes a threshold to be transgressed. Running counts of data points received for each slice are updated in thresholds 116 by confidential data backend 106.

Since the databus listener 110 only transfers data points for a particular slice to the backend queue 112 once the threshold for that slice has been transgressed, the confidential data data points corresponding to that slice may need to be retrieved from the confidential information database 108 once the threshold is determined to be transgressed. For example, if, as above, the threshold for a particular slice is 10 data points, the first nine data points received for that slice may simply be left in the confidential information database 108 and not sent to the backend queue 112. Then, when the tenth data point for the slice is stored in the confidential information database 108, the databus listener 110 may determine that the threshold has been transgressed and retrieve all 10 data points for the slice from the confidential information database 108 and send them to the backend queue 112 for processing.

It should be noted that the information obtained by the databus listener 110 from the confidential information database 108 and placed in the backend queue 112 is anonymized. In an example embodiment, no identification of the users who submitted the confidential data is provided to the backend queue 112. Indeed, in some example embodiments, the information provided to the backend queue may simply be the confidential data itself and any information needed in order to properly group the confidential data in one or more slices. For example, if slices are designed to group user confidential data based only on user title, location, and years of experience, other attributes for the user that might have been stored in the confidential information database 108, such as schools attended, may not be transferred to the backend queue 112 when the confidential data tied to those attributes are transferred to the backend queue 112. This further helps to anonymize the data, as it makes it more difficult for people to be able to deduce the identity of a user based on his or her attributes.

It should also be noted that any one piece of confidential data may correspond to multiple different slices and thus the databus listener 110 may, in some example embodiments, provide the same confidential data to the backend queue 112 multiple times. This can occur at different times as well, because each of the slices may have their own threshold that may be transgressed at different times based on different counts. Thus, for example, compensation data for a user in the San Francisco Bay Area with a job title of "software developer" and a school attended as "Stanford University" may be appropriately assigned to one slice of software developers in the San Francisco Bay area, a slice of "Stanford University" alums, and a slice of software developers in the United States. All slices may have their own thresholds and counts from confidential data from other users, who may or may not have complete overlap with these three slices.

An ETL backend 114 acts to extract, transform, and load the confidential data to anonymize and group it and place it back in the confidential information database 108 in a different location than it was stored in non-anonymized form. It should be noted that in some example embodiments, the anonymization described above with respect to the databus listener 110 may actually be performed by the ETL backend 114. For example, the databus listener 110 may send non-anonymized confidential data along with all attributes to the backend queue, and it may be the ETL backend 114 that reviews this data and discards certain elements of it to anonymize it.

In an example embodiment, the confidential information is stored in encrypted format in the confidential information database 108 when the databus listener 110 sends it to the backend queue 112. As such, one function of the ETL backend 114 is to decrypt the confidential information.

Encryption and decryption of the confidential data will be discussed in more detail below.

The ETL backend 114 writes the anonymized confidential data and slice information into an ETL table corresponding to the slice in the confidential information database 108. As described earlier, this ETL table may be stored in a different location than the confidential data was stored initially, such as the submission table described earlier.

At a later time, and perhaps using a batch or other periodic process, the information from the ETL table may be loaded in a distributed file system (DFS) 118. A confidential data relevance workflow 120 may then extract relevant information from the DFS and provide one or more insights on the relevant information in a confidential data insights data store 122. A confidential data relevance API 124 may then be utilized to provide insights from the confidential data insights data store 122 to the confidential data frontend 104, which can then display it to a user. As described earlier, these insights may be provided only on a "give-to-get" basis, namely that only users who provide confidential information (and/or provide it recently) can view insights. More generally, the machine learned score described earlier can be used to determine eligibility of a user to be shown the insights.

Figure 2A:
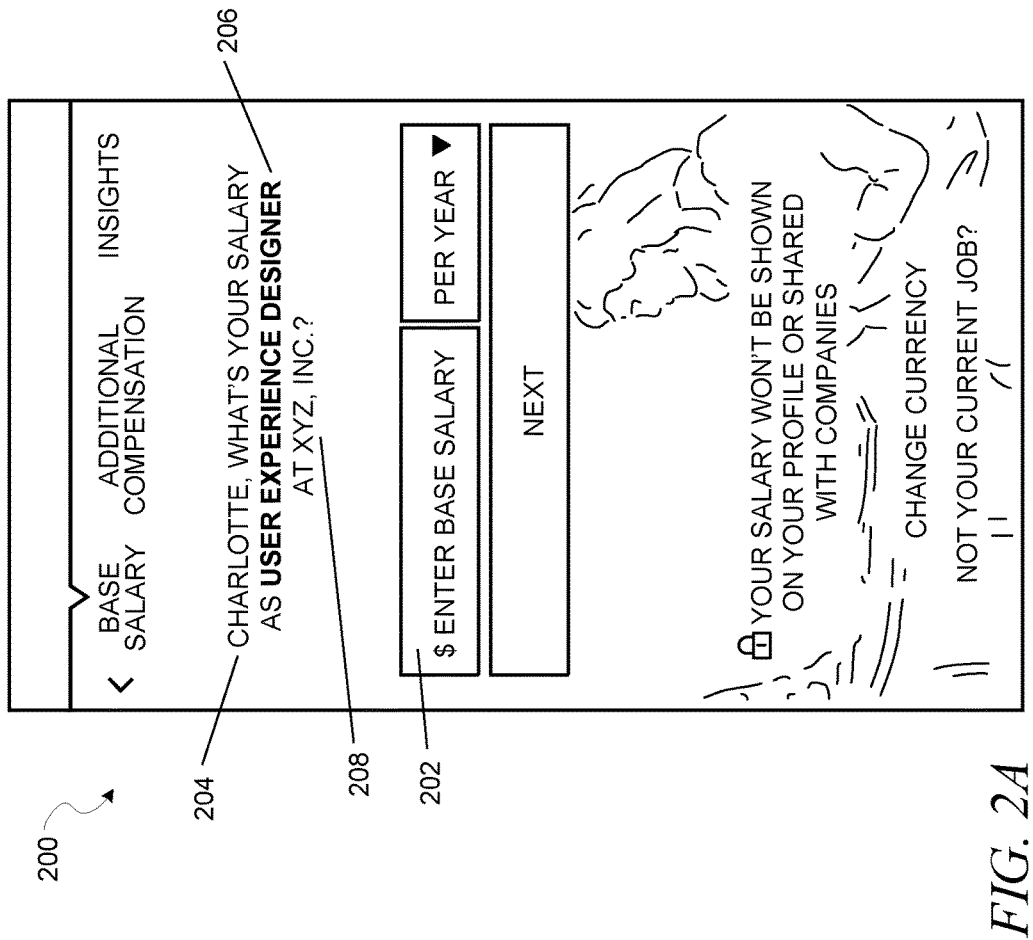
FIGS. 2A-2C are screen captures illustrating an example of a user interface provided by the confidential data frontend, in accordance with an example embodiment.
Figure 2B:
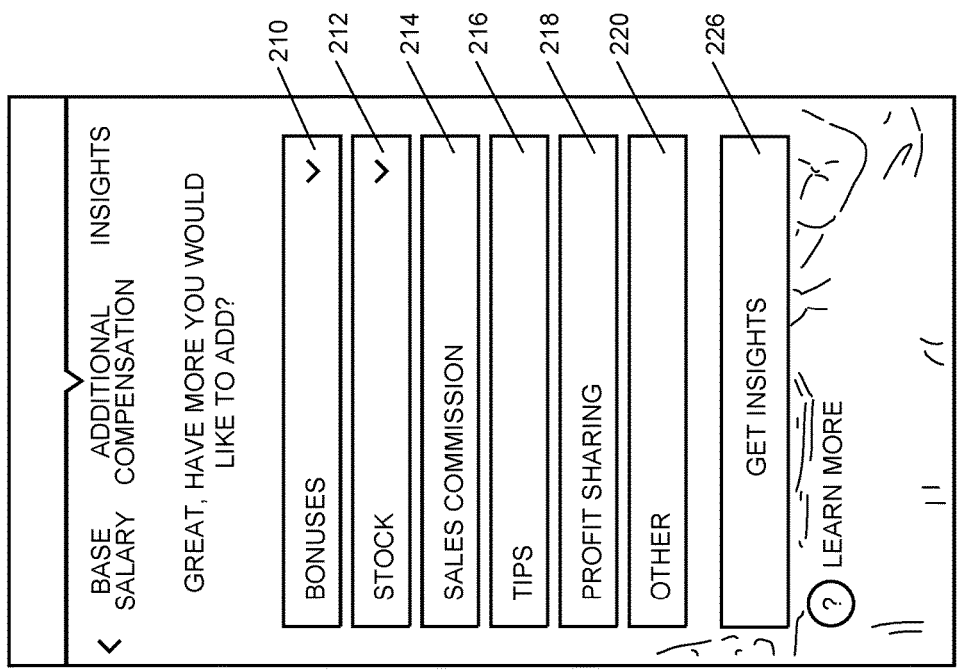
Figure 2C:
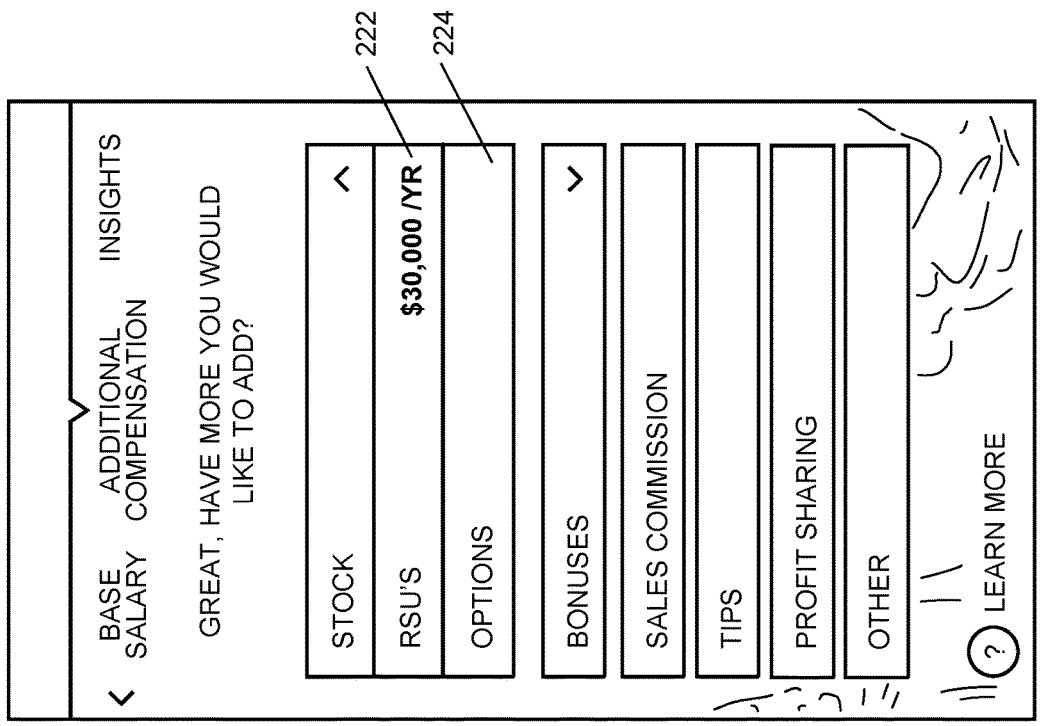

Turning now to more detail about the submission process, FIGS. 2A-2C are screen captures illustrating an example of a user interface 200 provided by the confidential data frontend 104, in accordance with an example embodiment. Referring first to FIG. 2A, the user interface 200 here is depicted as a screen of a stand-alone application operating on a mobile device, such as a smartphone. In FIG. 2A, the user is prompted to enter a base salary in text box 202, with a drop down menu providing options for different time periods on which to measure the base salary (e.g., per year, per month, per hour, etc.). Additionally, the user may be identified by name at 204, the user's title may be identified at 206, and the user's current employer may be identified at 208. This information may be prepopulated into the user interface 200, such as by retrieving this information from a member profile for the user in a social networking service. This eliminates the need for the user to enter this information manually, which can have the effect of dissuading some users from providing the confidential information or by completing the submission process, especially on a mobile device where typing or otherwise entering information may be cumbersome.

Turning to FIG. 2B, here the user interface 200 displays a number of other possible compensation types 210-220 from which the user can select. Selecting one of these other possible compensation types 210-220 causes the user interface 200 to provide an additional screen where the user can submit confidential data regarding the selected compensation type 210-220. Here, for example, the user has selected "Stock" 212. Referring now to FIG. 2C, the user interface 200 then switches to this screen, which allows the user to provide various specific details about stock compensation, such as restricted stock unit (RSU) compensation 222 and options 224. The user interface 200 at this stage may also display the other compensation types 210-220 for which the user can make additional submissions.

Referring back to FIG. 2B, when the user has completed entering all the confidential data, such as all the different compensation types appropriate for his or her current job, a "Get insights" button 226 may be selected, which launches a process by which the confidential data backend 106 determines whether the user is eligible to receive insights from compensation data from other users and, if so, indicates to the confidential data backend 106 that the insights should be provided. Additionally, selection of the "Get insights" button 226 represents an indication that the submission of the confidential data by this user has been completed, causing the confidential data backend 106 to store the confidential data in the confidential information database as described below, which then may trigger the databus listener 110 to extract the confidential information and cause the ETL backend 114 to anonymize the confidential data and place it in the appropriate ETL tables corresponding to the appropriate slices in which the confidential data belongs. This permits the submitted confidential data to be available for future insights.

Figure 3:
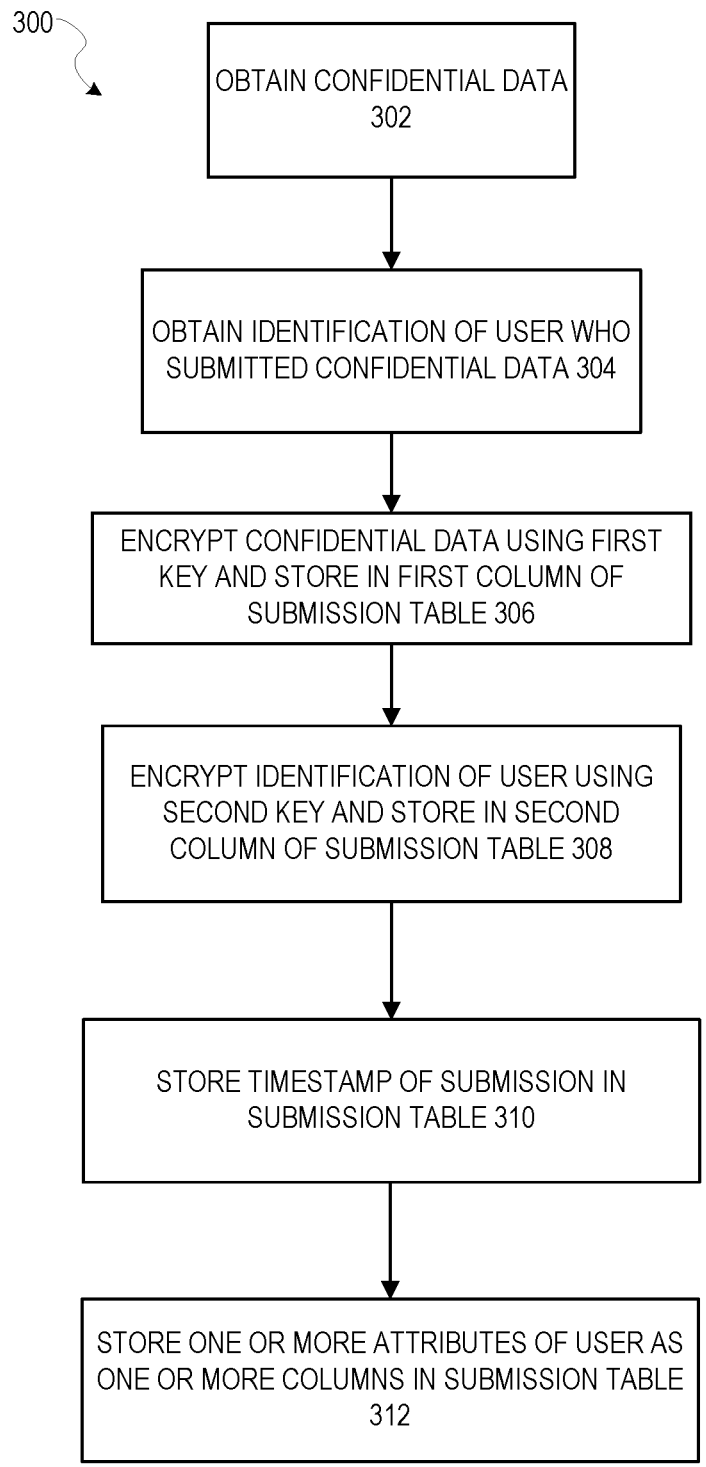
FIG. 3 is a flow diagram illustrating a method for confidential data collection and storage, in accordance with an example embodiment.

FIG. 3 is a flow diagram illustrating a method 300 for confidential data collection and storage, in accordance with an example embodiment. In an example embodiment, this method 300 may be performed by the confidential data backend 106 of FIG. 1. At operation 302, confidential data is obtained. At operation 304, an identification of the user who submitted the confidential data is obtained. It should be noted that while operations 302 and 304 are listed separately, in some example embodiments they may be performed in the same operation. For example, in an example embodiment, the confidential data frontend 104 may, upon receiving an indication from a user that input of confidential data in the confidential data frontend 104 by the user has been completed, forward the inputted confidential data and an identification of the user to the confidential data backend 106. In other example embodiments, however, the operations 302, 304 may be performed separately. For example, in an example embodiment, the identification of the user may not be obtained directly from the confidential data frontend 104, but rather some other type of identifying information may be obtained directly from the confidential data frontend 104, and this other type of identifying information may be used to query a social networking service or other third party service for the identification information for the user. Regardless, after operations 302 and 304 have been performed, the confidential data backend 106 now has at its disposal some confidential data and identification information for the user who entered the confidential data.

It should be noted that the confidential data may either be a single piece of information or may be multiple related pieces of information. For example, the confidential data may simply include a total compensation value and nothing more, or may include a complete breakdown of different types of compensation (e.g., base salary, bonus, stock, etc.).

Users are understandably concerned about the security of the confidential information, and specifically about a malicious user being able to correlate the confidential information and the identification of the user (i.e., not just learning the confidential information but tying the confidential information specifically to the user). As such, at operation 306, the confidential data is encrypted using a first key and stored in a first column of a submission table in a confidential information database. Then at operation 308, the identification of the user who submitted the confidential data is separately encrypted using a second key and stored in a second column of the submission table in the confidential information database.

Additionally, a number of optional pieces of information may, in some example embodiments, be stored in the submission table at this point. At operation 310, a timestamp of the submission of the confidential data may be stored in a column in the submission table. This timestamp may be used in, for example, a determination of whether the user is eligible to receive insights from confidential data submitted by other users. At operation 312, one or more attributes of the user may be stored as one or more columns in the submission table. These attributes may be used, for example, in determining to which slice(s) the confidential data may apply, as will be described in more detail below.

Figure 4:
FIG. 4 is a diagram illustrating an example of a submission table, in accordance with an example embodiment.

FIG. 4 is a diagram illustrating an example of a submission table 400, in accordance with an example embodiment. Each row in the submission table 400 corresponds to a different submission. Here, the submission table 400 includes five columns. In a first column 402, confidential data encrypted by a first key is stored. In a second column 404, identification of the user who submitted the corresponding confidential data, encrypted by a second key, is stored. In a third column 406, a timestamp for submission is stored. In a fourth column 408, a first attribute of the user, here location, is stored. In a fifth column 410, a second attribute of the user, here title, is stored. Of course, there may be additional columns to store additional attributes or other pieces of information related to the submission.

Notably, FIG. 4 depicts an example embodiment where only the first and second columns 402, 404 are encrypted, using different encryption keys. In some example embodiments, the additional columns 406-410 may also be encrypted, either individually or together. In some example embodiments one or more of these additional columns 406-410 may be encrypted using the same key as the first or second column 402, 404. Furthermore, in some example embodiments, the submission table 400 may be additionally encrypted as a whole, using a third encryption key different from the keys used to encrypt the first and second columns 402, 404.

It should be noted that while FIGS. 3 and 4 describe the confidential data as being stored in a single column in a submission table, in some example embodiments, this column is actually multiple columns, or multiple sub-columns, with each corresponding to a subset of the confidential data. For example, if the confidential data is compensation information, the confidential data may actually comprise multiple different pieces of compensation information, such as base salary, bonus, stock, tips, and the like. Each of these pieces of compensation information may, in some example embodiments, have its own column in the submission table. Nevertheless, the processes described herein with regard to the "column" in which the confidential data is stored apply equally to the embodiments where multiple columns are used (e.g., the individual pieces of compensation information are still encrypted separately from the user identification information).

Figure 5:
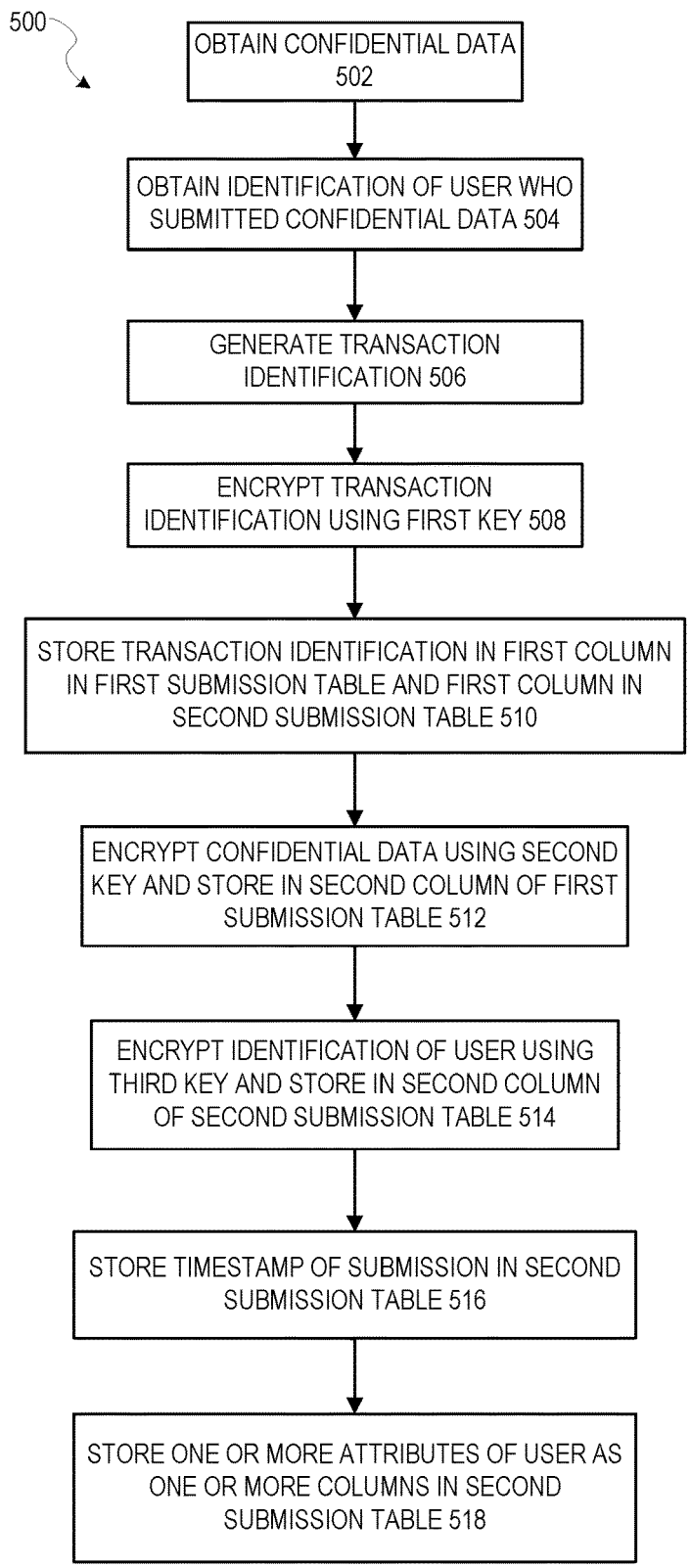
FIG. 5 is a flow diagram illustrating a method for confidential data collection and storage, in accordance with an example embodiment.

FIG. 5 is a flow diagram illustrating a method 500 for confidential data collection and storage, in accordance with an example embodiment. In contrast with FIG. 3, FIG. 5 represents an example embodiment where the confidential data and the identification of the user who submitted the confidential data are stored in separate tables in order to provide additional security. At operation 502, confidential data is obtained. At operation 504, an identification of the user to which the confidential data applies is obtained. As in FIG. 3, while operations 502 and 504 are listed separately, in some example embodiments they may be performed in the same operation.

At operation 506, a transaction identification is generated. This transaction identification may be, for example, a randomly generated number or character sequence that uniquely identifies the submission. At operation 508, the transaction identification may be encrypted using a first key. At operation 510, the transaction information (either encrypted or not, depending upon whether operation 508 was utilized) is stored in a first column in a first submission table and in a first column in a second submission table in a confidential information database.

At operation 512, the confidential data is encrypted using a second key and stored in a second column of the first submission table in the confidential information database. Then, at operation 514, the identification of the user who submitted the confidential data is separately encrypted using a third key and stored in a second column of the second submission table in the confidential information database.

Additionally, as in FIG. 3, a number of optional pieces of information may, in some example embodiments, be stored in the first and/or second submission tables at this point. At operation 516, a timestamp of the submission of the confidential data may be stored in a column in the second submission table. This timestamp may be used in, for example, a determination of whether the user is eligible to receive insights from confidential data submitted by other users. At operation 518, one or more attributes of the user may be stored as one or more columns in the second submission table. These attributes may be used, for example, in determining to which slice(s) the confidential data may apply, as will be described in more detail below. It should be noted that while operations 516 and 518 are described as placing information in the second submission table, in other example embodiments, one or more of these pieces of information may be stored in the first submission table.

If operation 508 is utilized, then the fact that the transaction identification is encrypted and is the only mechanism by which to link the confidential data in the first submission table with the user identification in the second submission table through a join operation provides an additional layer of security.

Figure 6:
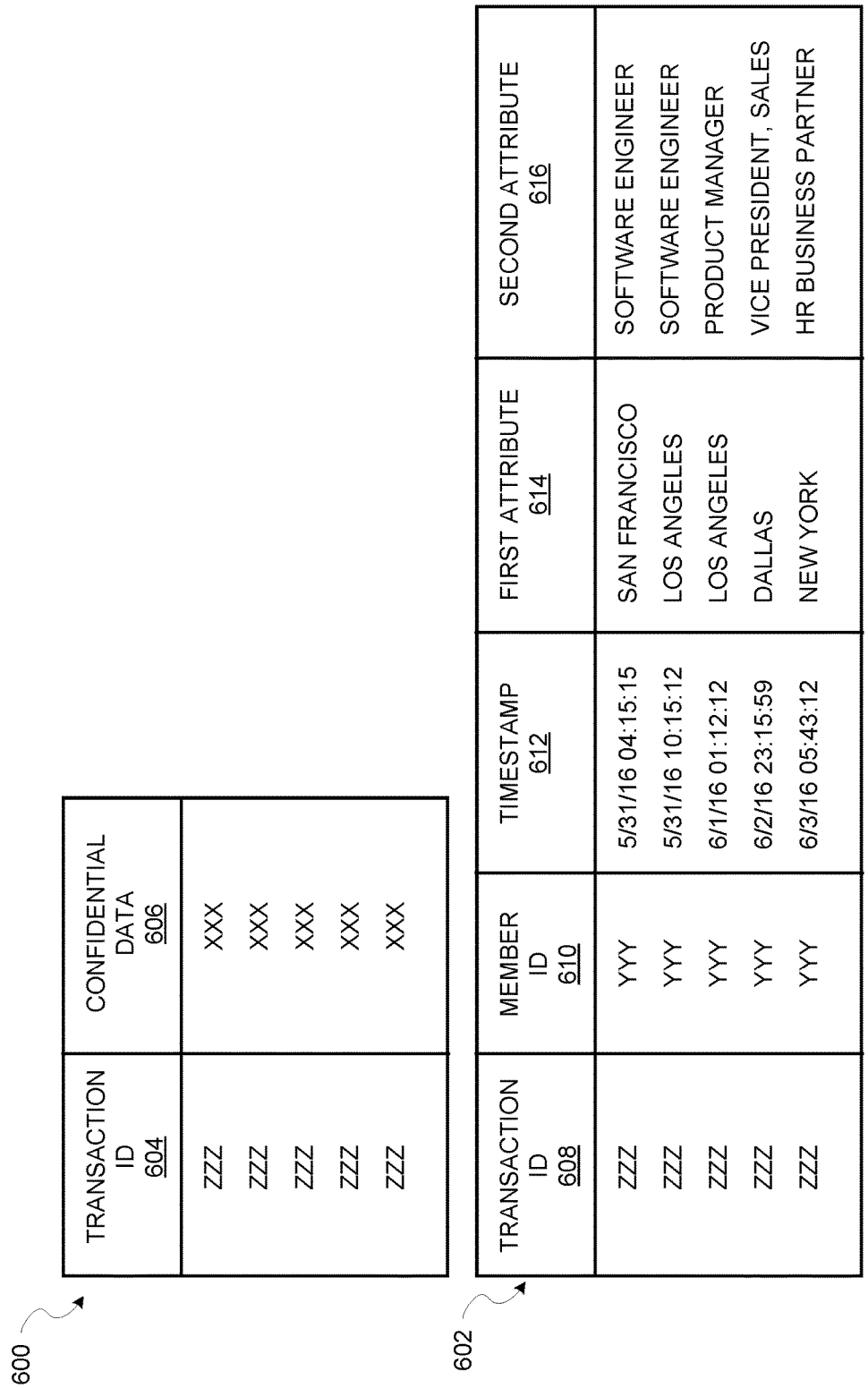
FIG. 6 is a diagram illustrating an example of a first submission table 600 and second submission table, in accordance with an example embodiment.

FIG. 6 is a diagram illustrating an example of a first submission table 600 and second submission table 602, in accordance with an example embodiment. Each row in each of the first and second submission tables 600, 602 corresponds to a different submission. Here, the first submission table 600 includes two columns. In a first column 604, transaction identification information encrypted by a first key is stored. In a second column 606, confidential data encrypted by a second key is stored.

The second submission table 602 includes five columns. In a first column 608, transaction identification information encrypted by a first key is stored. In a second column 610, identification of the user who submitted the corresponding confidential data, encrypted by a third key, is stored. In a third column 612, a timestamp for submission is stored. In a fourth column 614, a first attribute of the user, here location, is stored. In a fifth column 616, a second attribute of the user, here title, is stored. Of course, there may be additional columns to store additional attributes or other pieces of information related to the submission.

Notably, FIG. 6 depicts an example embodiment where only the first and second columns 608, 610 of the second submission table 602 are encrypted, using different encryption keys. In some example embodiments, the additional columns 612-616 may also be encrypted, either individually or together. Furthermore, in some example embodiments, the first and/or second submission tables 600, 602 may be additionally encrypted as a whole, using an additional encryption key(s) different from the keys described previously.

It should be noted that while FIGS. 5 and 6 describe the confidential data as being stored in a single column in a first submission table, in some example embodiments this column is actually multiple columns, or multiple sub-columns, with each corresponding to a subset of the confidential data.

For example, if the confidential data is compensation information, the confidential data may actually comprise multiple different pieces of compensation information, such as base salary, bonus, stock, tips, and the like. Each of these pieces of compensation information may, in some example embodiments, have its own column in the first submission table. Nevertheless, the processes described herein with regard to the "column" in which the confidential data is stored apply equally to the embodiments where multiple columns are used (e.g., the individual pieces of compensation information are still encrypted separately from the user identification information).

Referring back to FIG. 1, the databus listener 110 may utilize information received from the confidential data frontend 104 to query one or more services for attributes. One of these services may be member services 126, which may be queried using a member identification provided by the confidential data frontend 104 and return one or more attributes from a member profile in a social networking service. Another of these services may be a standardization service 128, which may receive an attribute value (either obtained directly from the confidential data frontend 104 or obtained from one of services 126, 128) and return a standardized version of that attribute. For example, the standardization service 128 may take an actual title as input and return a standardized version of that title. The actual title may have either been, for example, input by the user to the confidential data frontend 104, or retrieved as part of the member profile from the member services 126. A company details service (not pictured) may take a company identification or name as input and return details about that company for inclusion as derived attributes.

Other attributes may be added as part of an offline join between the submission table and other tables in other databases containing attributes. For example, member usage data such as how often a member interacts with a social networking service and how complete the member's profile is may be stored in offline databases that are not queryable in real time using, for example, an API. This type of attribute may be obtained using this offline mechanism in a batch mode.

One issue that arises with the use of timestamps is that it is theoretically possible for a malicious user to de-anonymize the confidential data by performing a join on the anonymized data with data containing the member identity, by joining on the timestamp. For example, the malicious user can derive the member identification and timestamp from PageView events, and then join this information with the anonymized data stored in the distributed file system to infer who submitted the compensation entry. It should be noted that the timestamps that produce this risk are generated at numerous places in the system, and not just the timestamp of the confidential data submission as described earlier. For example, logging occurs at various stages, including when a communication is sent out to the user asking for a submission of confidential data, when the user opens the communication, when the user clicks a link in the communication to begin the submission process, and so on. This obviously increases the risk that a timestamp-based inference attack could be successful.

In an example embodiment, the timestamps are modified in a manner to prevent this type of join operation from being successful and thus protect against such timestamp-based inference attacks. There may be various ways to modify these timestamps to achieve optimal results. These may be performed at any to all of the points at which timestamps are logged. In some example embodiments, the timestamps are only modified at logging points that present a significant security threat.

In a first example embodiment, a random or semi-random distribution is selected, such as a zero mean probability distribution like a Gaussian distribution. The width (standard deviation) of the distribution may be selected based on the level of privacy desired. A random value from the distribution is then added to every timestamp to change the value of the timestamp. Of course, the greater the standard deviation, the more noise that may be introduced into timestamps and the less relevant the timestamps themselves become. In an example embodiment, the standard deviation selected is based on the amount and frequency of traffic. For example, if it is observed that the maximum time period between submissions is time t, then the standard deviation may be set at $c*t$, where c is a constant.

In a variation of the first example embodiment, the random value is added to the timestamp only when the timestamp is added to the distributed file system, and not earlier in the workflow, such as when the confidential data is stored in the confidential data backend 160, or moved to the backend queue 112, or handled by the ETL backend 114, or added to the confidential information database 108. Thus, for example, a timestamp generated when a user submits confidential data may remain the same until the confidential data and timestamp are moved to the distributed file system 118, at which stage the timestamp is modified to add the random value.

In a second example embodiment, k-anonymity is used to generalize the timestamp. Specifically, a hierarchy of timestamps is defined, with each level being a different granularity of time. For example, the top level of the hierarchy may be date, the next level down may be hour, the next level down may be minute, the next level down may be second, the next level down may be millisecond, etc. Each timestamps is then generalized to the next highest level of granularity from the bottom level at which there are at least k−1 other entries. This essentially hides each timestamp among the other timestamps that are around the same time. If there are a number of timestamps at around the same millisecond, then it is enough to generalize the timestamp to the millisecond, but if there is only enough timestamps at around the same hour, then the timestamps are generated to the same hour.

Figure 7:
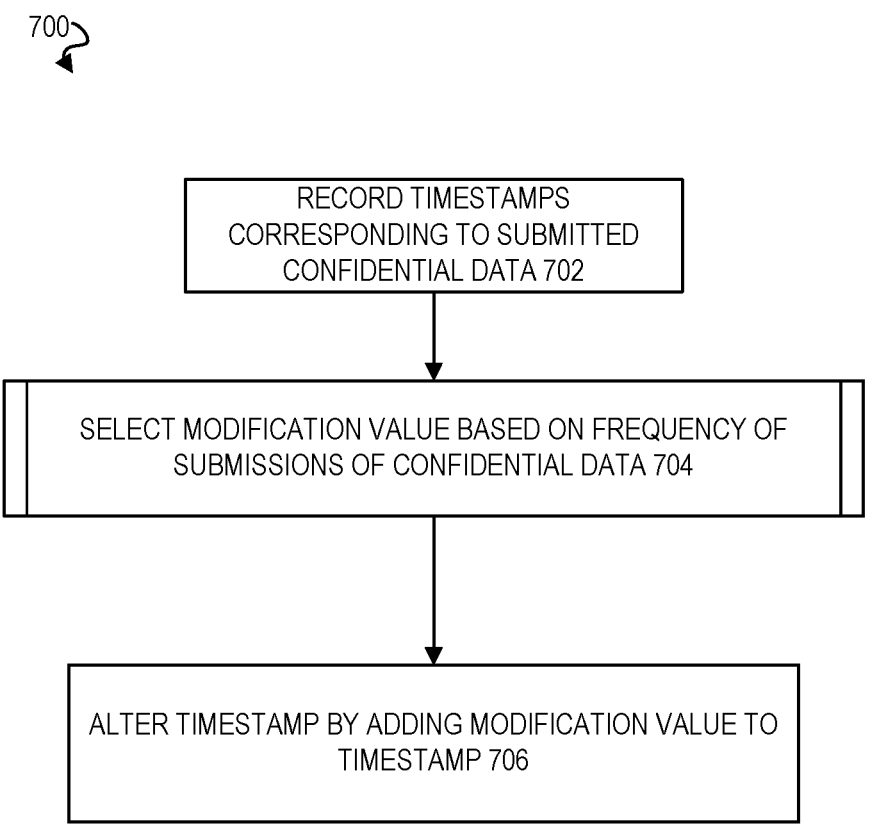
FIG. 7 is a flow diagram illustrating a method for protecting against timestamp-based inference attacks in a computer system, in accordance with an example embodiment.

FIG. 7 is a flow diagram illustrating a method 700 for protecting against timestamp-based inference attacks in a computer system, in accordance with an example embodiment. At operation 702, a timestamp corresponding to a time when confidential data is submitted to the computer system by a user is recorded. At operation 704, a modification value is selected based on a frequency of submissions of confidential data to the computer system. In a first example embodiment, this selecting involves selecting a random value from a zero mean probability distribution having a standard deviation, wherein the standard deviation is based on a maximum time period between submissions to the computer system. The maximum time period may be derived through analysis of past submissions. It should be noted that while the term "maximum" is used, the time period selected as the maximum time period may be selected from a subset of all prior submissions, such that outliers or outdated submissions may be ignored or discarded.

Figure 8:
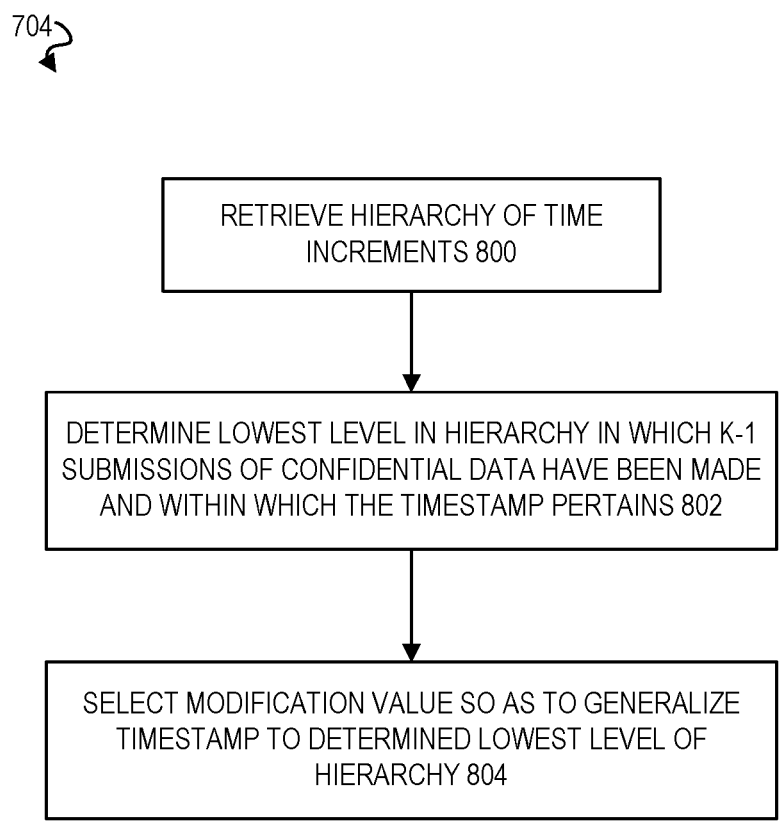
FIG. 8 is a flow diagram illustrating a method for selecting a modification value in accordance with k-anonymity.
Figure 9:
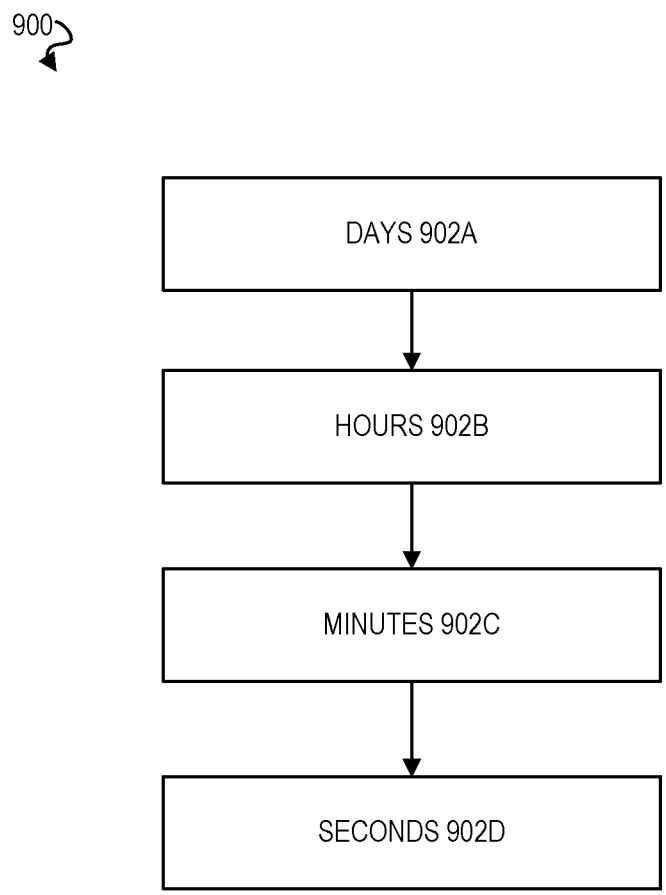
FIG. 9 is a diagram illustrating an example of a hierarchy of time increments in accordance with an example embodiment.

In a second example embodiment, the selecting is based on k-anonymity. FIG. 8 is a flow diagram illustrating a method 704 for selecting a modification value in accordance with k-anonymity. Specifically, at operation 800, a hierarchy of time increments is retrieved. The hierarchy includes a plurality of levels, a top level representing a largest increment of time between submissions to the computer system and each level below the top level being a smaller and smaller increment of time between submissions to the computer system. FIG. 9 is a diagram illustrating an example of a hierarchy 900 of time increments in accordance with an example embodiment. Here, the hierarchy includes four levels 902A, 902B, 902C, and 902D. The top level 902A corresponds to a time increment of days. The next level 902B corresponds to a time increment of hours. The next level 902C corresponds to a time increment of hours. The bottom level 902D corresponds to a time increment of seconds.

Referring back to FIG. 8, at operation 802, a lowest level, of the levels in the hierarchy 900, in which at least k−1 submissions of confidential data have been made to the computer system and within which the confidential data to which the timestamp pertains was submitted is determined. At operation 804, the modification value is selected so as to generalize the timestamp to the determined lowest level of hierarchy. Referring back to FIG. 7, at operation 706, the timestamp is altered by adding the modification value to the timestamp.

Figure 10:
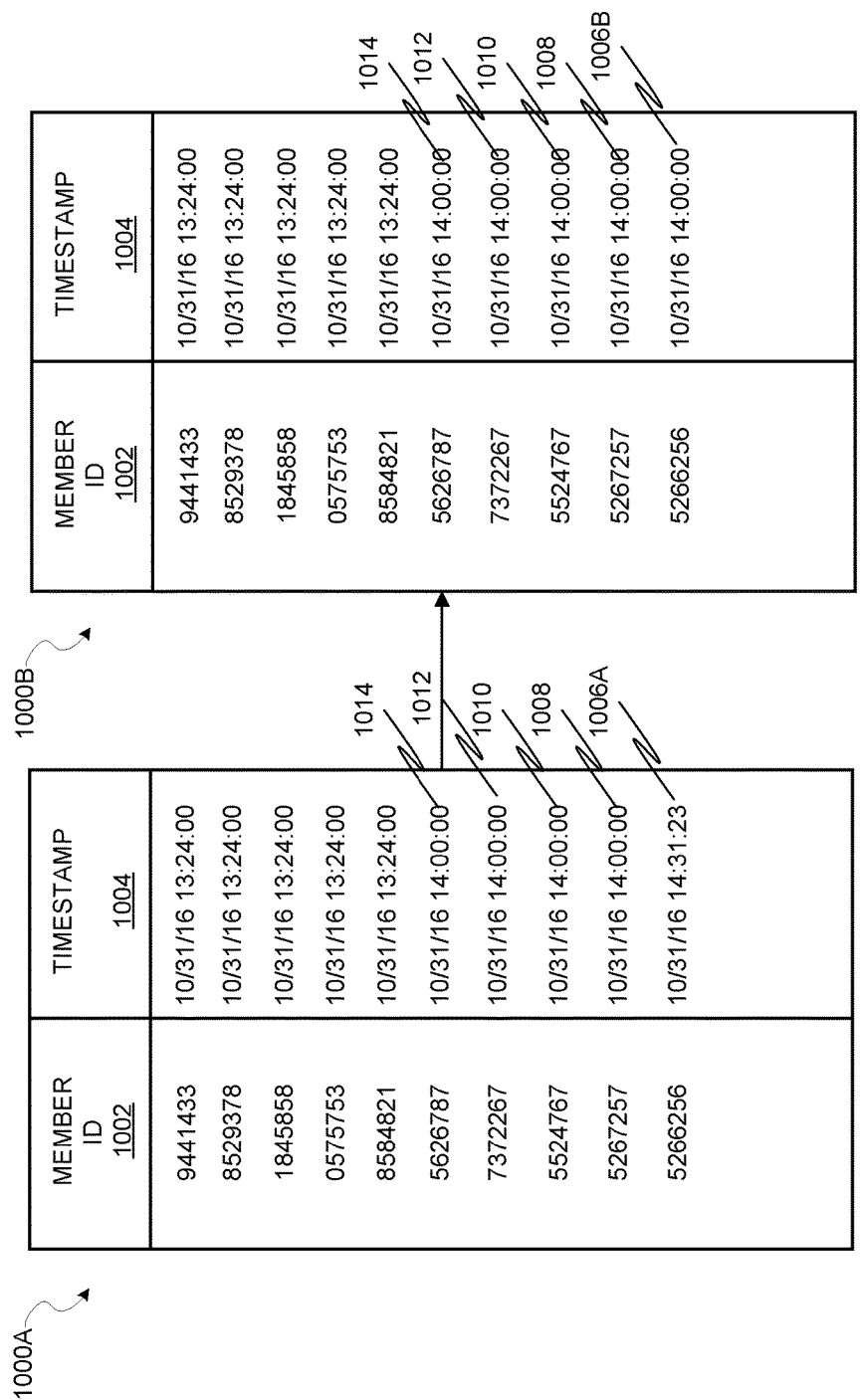
FIG. 10 depicts example submission history tables in accordance with an example embodiment.

FIG. 10 depicts example submission history tables 1000A, 1000B in accordance with an example embodiment. Here, submission history table 1000A represents a tracking of submissions of confidential data to the computer system. Included in the submission history table 1000A is a list of identifications of members 1002 making the submissions and the corresponding timestamps 1004 of the submissions. As can be seen, there are ten submissions depicted. The current submission may be the submission with timestamp 1006A, meaning that the previous submissions in the submission history table 1000A may (or may not) have already been altered in accordance with the methods of the current disclosure. Here, it may be assumed that k-anonymity was already performed on the previous submissions, with a k value of 4. As such, the previous submissions have all been rounded to different levels of the hierarchy. Here, timestamp 1006A is Oct. 31, 2015 at 14:31:23, meaning Oct. 31, 2015 at 2:31 pm and 23 seconds. Looking first at the bottom level 902D of the hierarchy 900, it can be seen that there are not at least 3 (in other words, k−1) other submissions made within the same second as timestamp 1006A, hence the next level up in the hierarchy 900, specifically level 902C is examined. Here, there is one other timestamp, namely timestamp 1008, within the same minute as timestamp 1006A, but this is not enough to satisfy the k−1 criterion. Thus, the next level up in the hierarchy 900, specifically level 902B is exampled. Here, there are 4 other timestamps, namely timestamps 1008, 1010, 1012, and 1014 within an hour of timestamp 1006A, so it is determined that timestamp 1006A should be generalized to the hour level. This involves zeroing out the second and minute tracking for timestamp 1006A. This is depicted in FIG. 10, where timestamp 1006A has been replaced with timestamp 1006B (Oct. 31, 2015 at 14:00:00). Notably, now there are 5 different timestamps 1006B, 1008, 1010, 1012, and 1014 in submission history table 1000B that have all been generalized to the same hour, thus making it difficult for an attacker to determine which of these timestamps pertains to a particular user.

Another type of inference attack can occur based on confidential data values themselves, such as the compensation data. In this attack, a malicious user joins the confidential data with itself, based on the exact values for the confidential data, thereby identifying multiple attributes associated with each piece of confidential data. Specifically, a malicious user may randomly select a particular value and then attempt a join using that value, and if that value happens to uniquely match one particular member's confidential data value, then the malicious user can potentially gain knowledge of the attributes of that user.

For example, in the case where the confidential data value is a compensation value, such as $87,585, this value may be somewhat unique in that there may not be any other users with the same exact compensation value in the same field/location/background. This makes it easier for an attacker to deduce the attributes of that user, and then potentially their identity.

In an example embodiment, the confidential data values are modified in a manner to prevent this type of join operation from being successful and thus protect against such confidential value-based inference attacks. There may be various ways to modify these confidential data values to achieve optimal results. These may be performed at any to all of the points at which the confidential data is tracked. In some example embodiments, the confidential data values are only modified at points that present a significant security threat.

In a first example embodiment, a random or semi-random distribution is selected, such as a zero mean probability distribution like a Gaussian distribution. The width (standard deviation) of the distribution may be selected based on the level of privacy desired. A random value from the distribution is then added to every confidential data value to alter its value. Of course, the greater the standard deviation, the more noise that may be introduced into the values and the less relevant and precise the values themselves become. In an example embodiment, an unbiased distribution is utilized, such as Gaussian or Laplace.

In an example embodiment, the distributions may be different for different slices, such that, for example, the standard deviation may be different for one slice than another. The standard deviation may be selected based on the number of values of confidential data in the slice.

In a variation of the first example embodiment, the random value is added to the confidential data value when the confidential data value is added to the distributed file system, and not earlier in the workflow, such as when the confidential data is stored in the confidential data backend 160, or moved to the backend queue 112, or handled by the ETL backend 114, or added to the confidential information database 108.

In a second example embodiment, k-anonymity is used to generalize the confidential data values. Specifically, a hierarchy of confidential data values is defined, with each level being a different granularity of value. For example, if the confidential data value is a compensation amount, the top level of the hierarchy may be millions, the next level down may be hundred thousands, the next level down may be ten thousands, the next level down may be thousands, the next level down may be hundreds, the next level down may be tens, and the lowest level may be ones. Each piece of confidential data is then generalized to the next highest level of granularity from the bottom level at which there are at least k−1 other entries. This essentially hides each confidential data value among the other confidential data values that are near in value.

In an example embodiment, the confidential data may be comprised of multiple different, but related, confidential data values. For example, compensation data may include an overall total compensation value but also individual breakdowns of the components of this total compensation value (e.g., salary, bonus, stock, etc.). Indeed, even these broken down components could possibly be broken down even more (e.g., bonus may be broken into a company-wide bonus and a merit bonus). In such instances, it may be enough to alter the confidential data values for some if not all of the constituent components and not alter the higher granularity values, as those values will be affected by the alteration of the individual constituent components.

Figure 11:
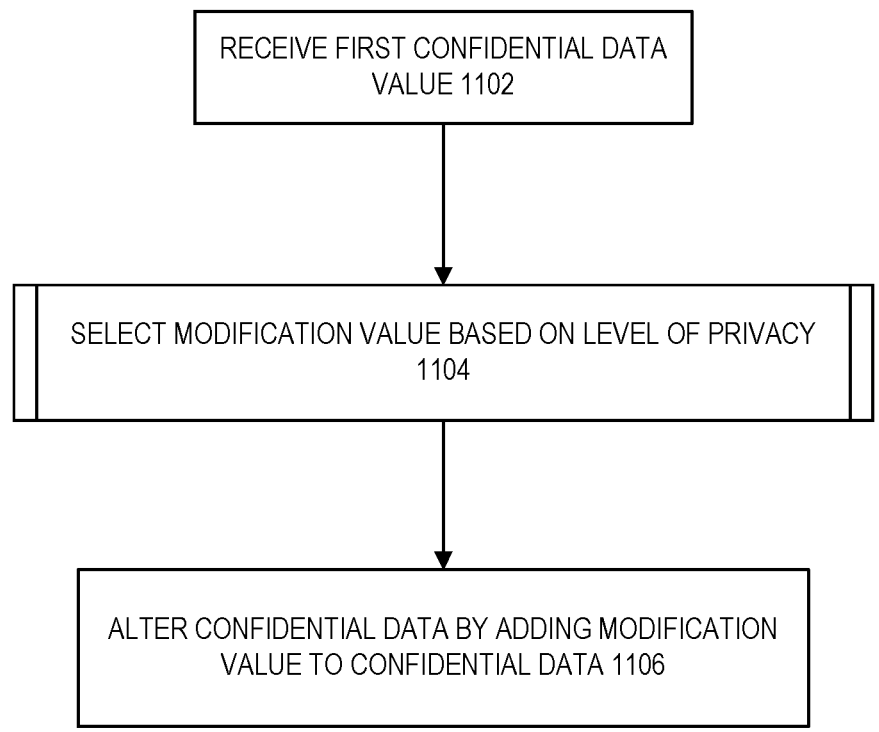
FIG. 11 is a flow diagram illustrating a method for protecting against confidential data-based inference attacks in a computer system, in accordance with an example embodiment.

FIG. 11 is a flow diagram illustrating a method 1100 for protecting against confidential data-based inference attacks in a computer system, in accordance with an example embodiment. At operation 1102, a first confidential data value is received. At operation 1104, a modification value is selected based on a level of privacy specified for the computer system. In a first example embodiment, this selecting involves selecting a random value from a zero mean probability distribution having a standard deviation, wherein the standard deviation is based on the level of privacy.

Figure 12:
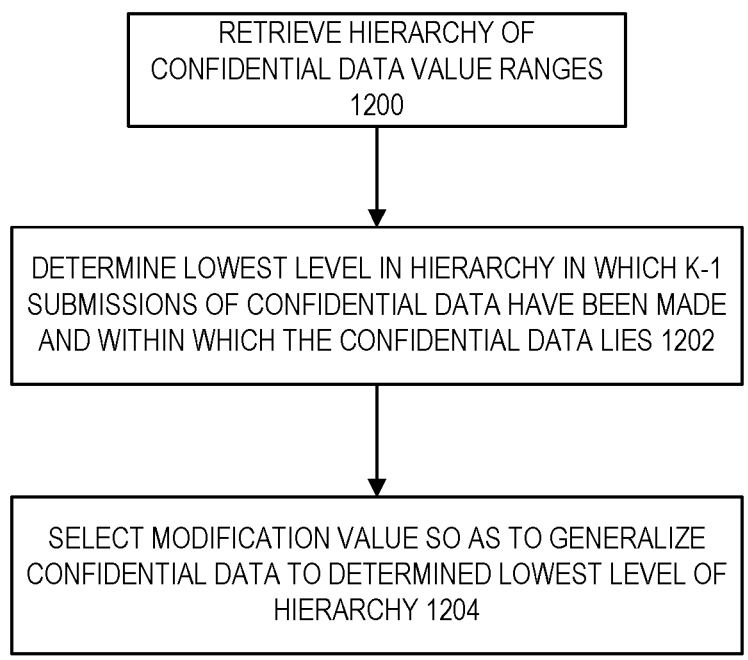
FIG. 12 is a flow diagram illustrating a method for selecting a modification value in accordance with k-anonymity.
Figure 13:
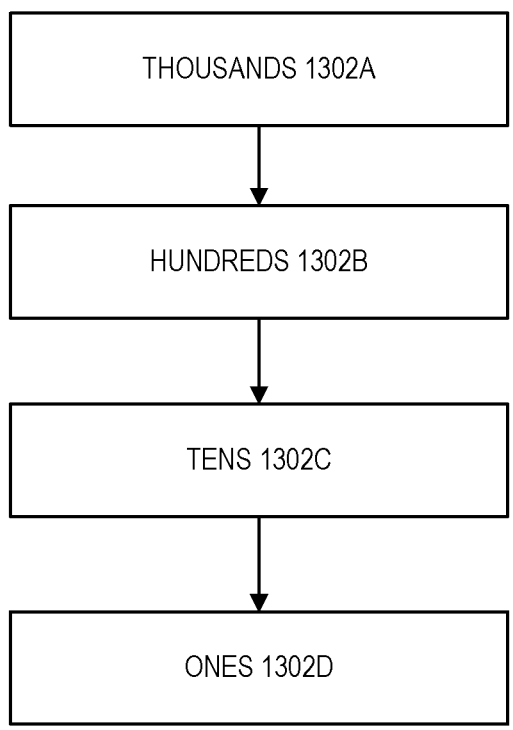
FIG. 13 is a diagram illustrating an example of a hierarchy of confidential value ranges in accordance with an example embodiment.

In a second example embodiment, the selecting is based on k-anonymity. FIG. 12 is a flow diagram illustrating a method 1104 for selecting a modification value in accordance with k-anonymity. Specifically, at operation 1200, a hierarchy of confidential data value ranges is retrieved. The hierarchy includes a plurality of levels, a top level representing a largest range and each level below the top level being a smaller and smaller increment of range. FIG. 13 is a diagram illustrating an example of a hierarchy 1300 of confidential value ranges in accordance with an example embodiment. Here, the hierarchy includes four levels 1302A, 1302B, 1302C, and 1302D. The top level 1302A corresponds to a range of thousands. The next level 1302B corresponds to a range of hundreds. The next level 1302C corresponds to a range of tens. The bottom level 1302D corresponds to a range of ones.

Referring back to FIG. 12, at operation 1204, the modification value is selected so as to generalize the confidential data value to the determined lowest level of hierarchy.

Referring back to FIG. 11, at operation 1106, the confidential data value is altered by adding the modification value to the confidential data value.

Figure 14:
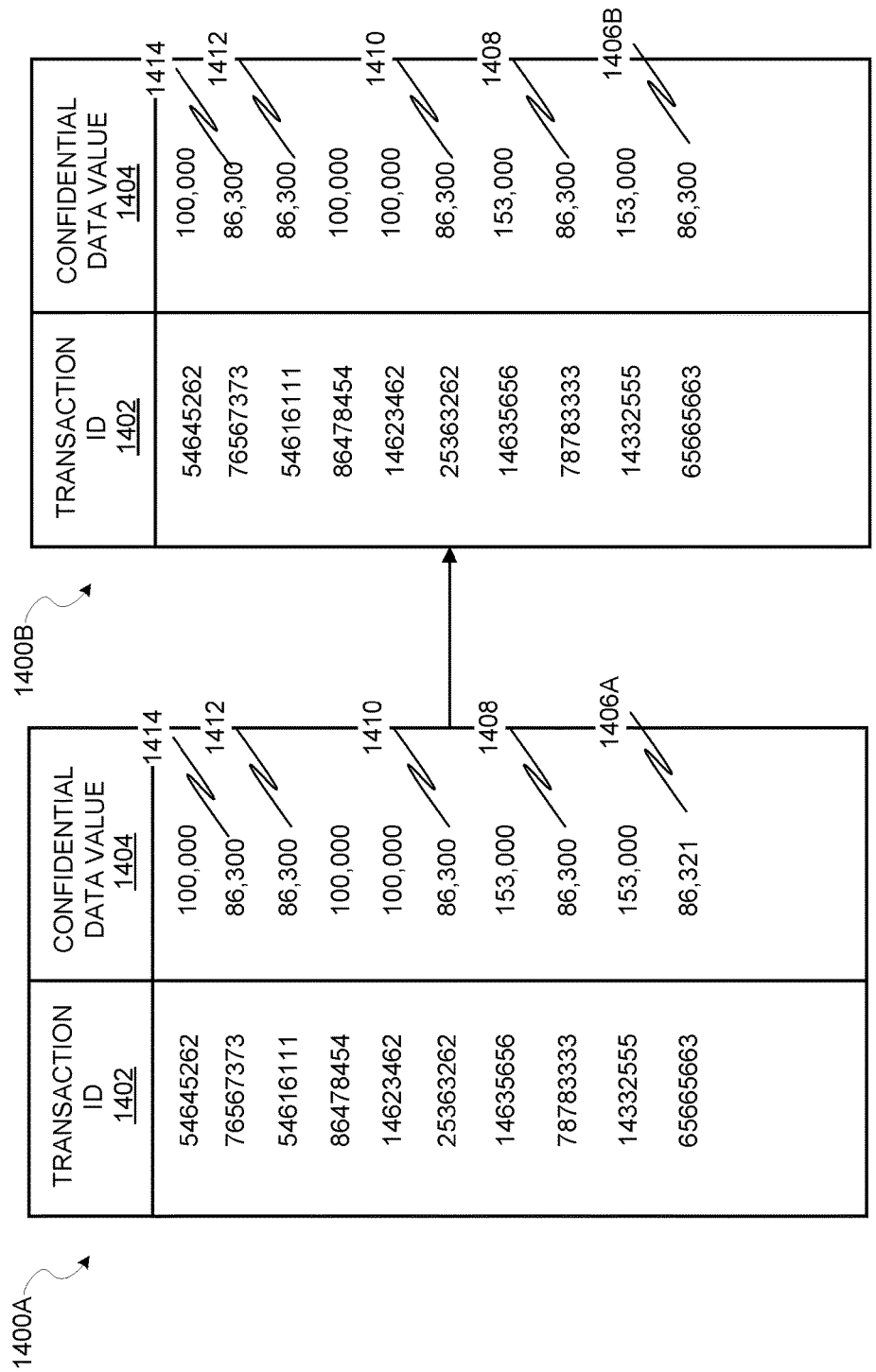
FIG. 14 depicts example submission tables in accordance with an example embodiment.

FIG. 14 depicts example submission tables 1400A, 1400B in accordance with an example embodiment. Here, submission table 1400A represents a tracking of submissions of confidential data to the computer system. Included in the submission table 1400A is a list of identifications of transactions 1402 and the corresponding confidential data values 1404 submitted. As can be seen, there are ten submissions depicted. The current submission may be the submission with confidential data value 1406A, meaning that the previous submissions in the submission table 1400A may (or may not) have already been altered in accordance with the methods of the current disclosure. Here, it may be assumed that k-anonymity was already performed on the previous submissions, with a k value of 4. As such, the previous submissions have all been rounded to different levels of the hierarchy. Here, confidential data value 1406A is $86,321. Looking first at the bottom level 1302D of the hierarchy 1300, it can be seen that there are not at least 3 (in other words, k−1) other submissions made within a dollar of the confidential data value 1406A, hence the next level up in the hierarchy 1300, specifically level 1302C is examined. Here, there are no other confidential data value within the same ten dollar range as confidential data value 1406 and this is not enough to satisfy the k−1 criterion. Thus, the next level up in the hierarchy 1300, specifically level 1302B is examined. Here, there are 4 other confidential data values, namely confidential data values 1408, 1410, 1412, and 1414 within a hundred dollar range of confidential data value 1406, so it is determined that confidential data value 1406 should be generalized to the hundred dollar range. This involves rounding it to the nearest hundred dollar range. This is depicted in FIG. 14, where confidential data value 1406 has been replaced with confidential data value 1406B ($86,300). Notably, now there are 5 different confidential data values 1406B, 1408, 1410, 1312, and 1414 in submission table 1400B that have all been generalized to the same hundred dollar range, thus making it difficult for an attacker to determine which of these confidential data values pertains to a particular user.

Another issue that can arise is members submitting confidential data values multiple times or too often. Since the association between each member and his or her confidential data is removed during the anonymization process, it is possible for a member to create bias in the confidential data slices by submitting values too often or in a repeat manner. For example, if an average salary is to be obtained from a group of ten values, if a single member submits his salary twice it will skew the average towards that member's salary. This type of overrepresentation may also occur in the context of what is known as "spam", namely a member intentionally attempting to skew results or achieve some other goal by over-submitting confidential data values.

In an example embodiment, a submission history table is maintained that contains information about submissions made by members but does not contain the confidential data values themselves. Here, for example, a member who submitted a confidential data value may be logged (by, for example, member identification) along with a timestamp of the submission. This submission history table may then be referenced whenever a member attempts to submit a confidential data value to determine whether or not that member is permitted to submit the confidential data value at that time. It should be noted that this submission history table may be separate from the previously described submission table, although in embodiments where the submission table is comprised of multiple submission tables, it is possible that one of the multiple submission tables is the submission history table. Specifically, as long as the table contains submission information without containing the confidential data itself it can be considered a submission history table.

The test for whether or not a member is permitted to submit the confidential values at a particular time may be based on many different factors. In one example embodiment, a limit is based on the frequency at which confidential values may be submitted. For example, a member may be limited to submitting confidential data only once every six months.

In another example embodiment, a member may be permitted to submit confidential data if one or more particular types of changes to the member's social networking profile have been made. For example, the member may be permitted to submit confidential data if the member has recently changed the member's profile to reflect a new position, update a current position description, change employers, etc. It should be noted that this embodiment may also be combined with the frequency-based embodiment described above, in that, for example, a user may be permitted to submit confidential data only once every six months but an exception is made if the member has recently changed the member's profile in one of the prescribed ways. Additionally, in some example embodiments it is not merely whether a change of a particular type has been made but the degree of change. If a member's job title has change only slightly, for example, from software engineer to software developer, then this change may be deemed not significant enough to warrant a new confidential data submission, whereas if the member's job title has changed more drastically, for example, from software engineer to product manager, then this change may be deemed significant enough to warrant a new confidential data submission.

In an example embodiment, the frequency set (e.g., one every six months) may be variable based on different functions/industries. Specifically, a different frequency may be assigned to one industry versus another industry. These frequencies may be set based on statistical information about the industry, such as the rate of change of pay in the industry and how often people change jobs in the industry.

Figure 15:
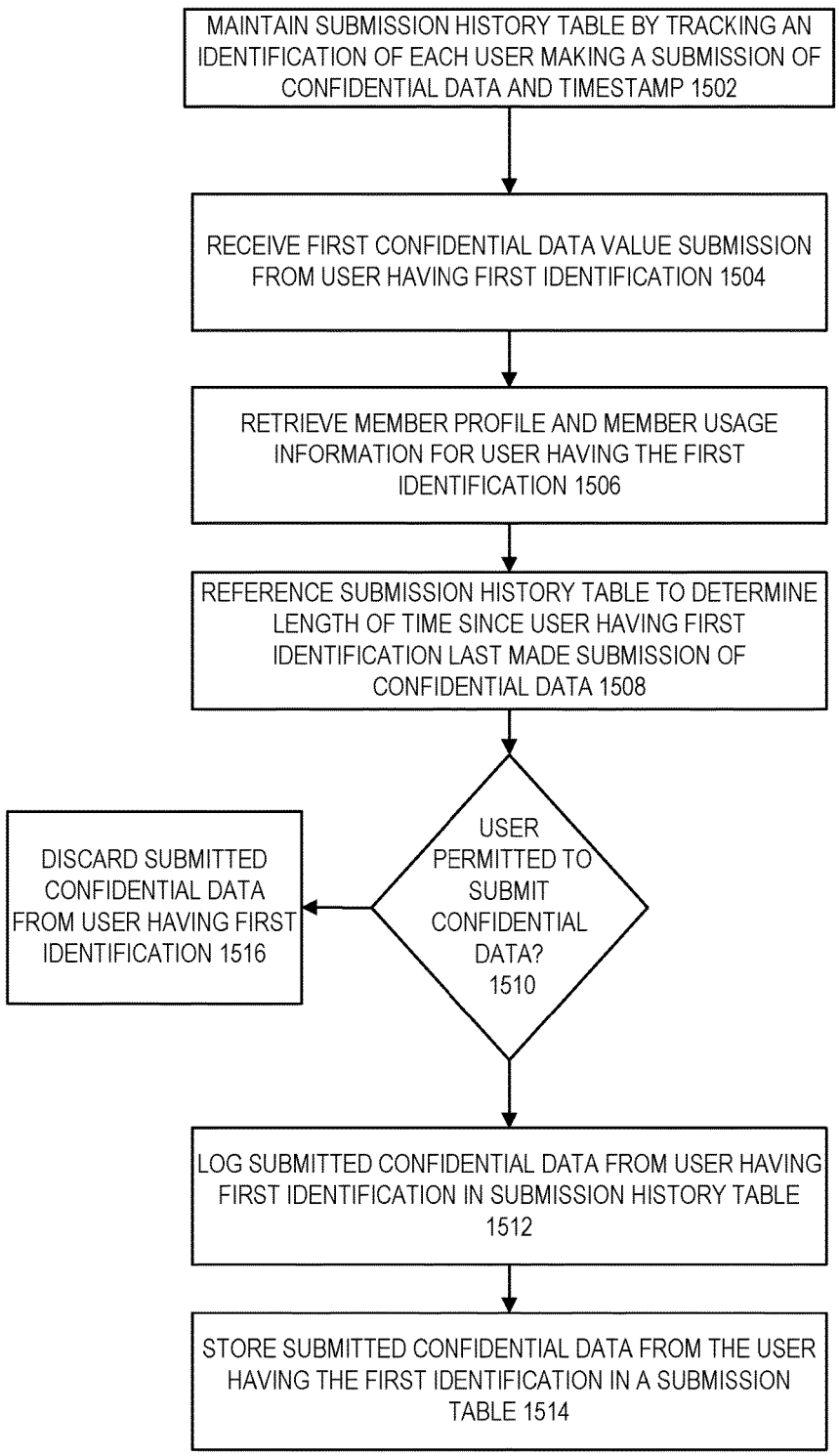
FIG. 15 is a flow diagram illustrating a method of protecting against over-submission of confidential data values in a computer system, in accordance with an example embodiment.

FIG. 15 is a flow diagram illustrating a method 1500 of protecting against over-submission of confidential data values in a computer system, in accordance with an example embodiment. At operation 1502, a submission history table is maintained by tracking an identification of each user making a submission of a confidential data value and a timestamp of when the corresponding submission was made. At operation 1504, a first confidential data value submission is received from a user having a first identification. At operation 1506, a member profile and member usage information for the user having the first identification is retrieved, based on the first identification. At operation 1508, a submission history table is referenced to determine a length of time since the user having the first identification last made a submission of confidential data. At operation 1510, it is determined whether or not the user is permitted to submit confidential data based on the member usage information and the length of time since the user having the first identification last made a submission of confidential data. If so, then at operation 1512, the submitted confidential data from the user having the first identification is logged in the submission history table. Then, at operation 1514, the submitted confidential data from the user having the first identification is stored in a submission table.

If at operation 1510 it is determined that the user is not permitted to submit confidential information, then at operation 1516 the submitted confidential data from the user having the first identification is discarded.

In an example embodiment, a machine learning algorithm is utilized to train a model to determine whether or not the user is permitted to submit confidential information. In other words, operation 1510 may be performed by passing the member profile, member usage information, and entries in the submission history table for the user having the first identification to a member submission model trained by a machine learning algorithm to extract features from the member profile and the member usage information and make a determination as to whether the user having the first identification is permitted to submit confidential information based on the features and the length of time since the user having the first identification last made a submission of confidential data. Extraction may be performed via a number of different extraction techniques. In a simple case, an element of a member profile data structure (such as member industry) or member usage information data structure (such as frequency of member profile update) can be pulled from the data structure to be fed to the machine learning algorithm without transformation. In other example embodiments, more complex transformations and/or pre-processing may be performed.

Figure 16:
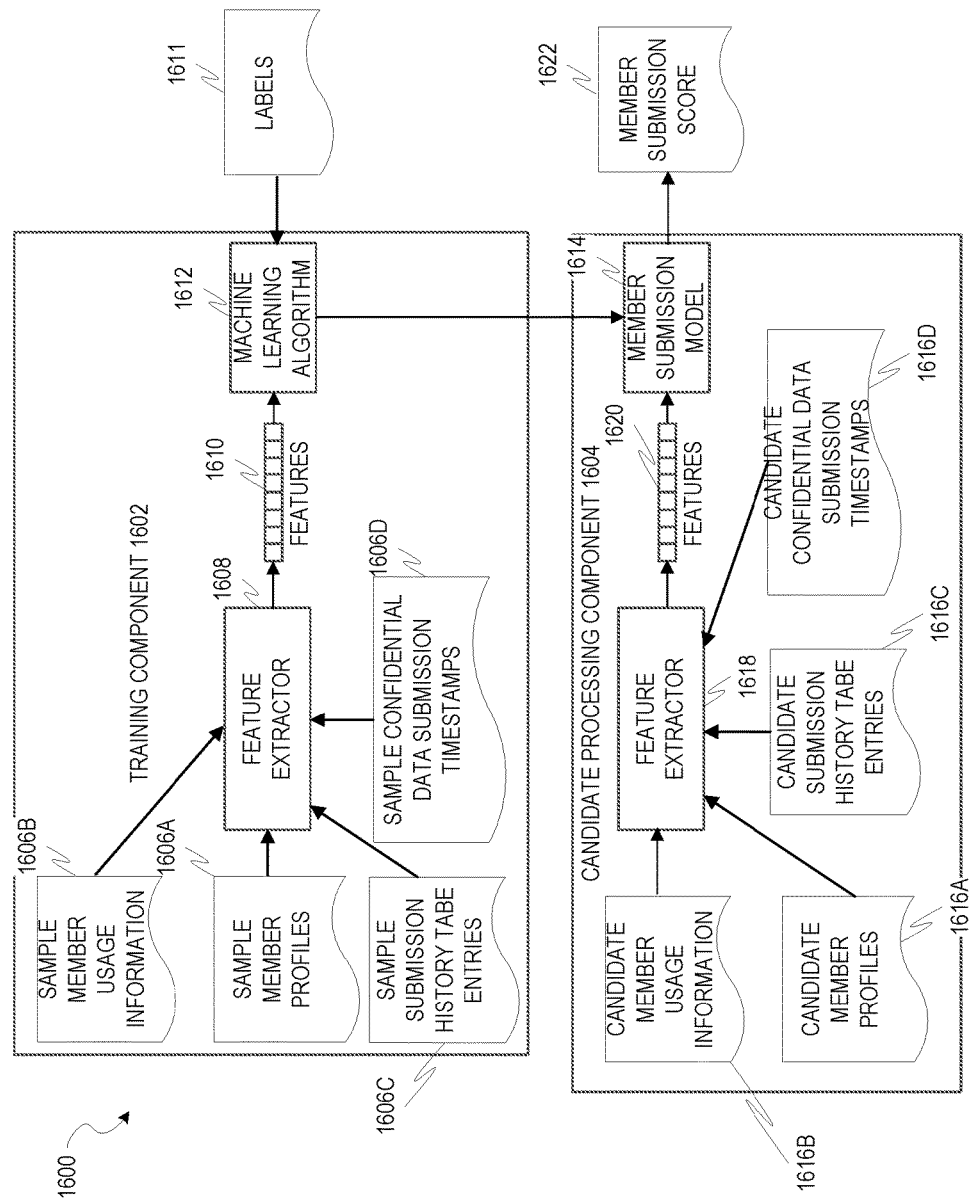
FIG. 16 is a block diagram illustrating a system for performing machine learning to train a member submission model in accordance with an example embodiment.

FIG. 16 is a block diagram illustrating a system 1600 for performing machine learning to train a member submission model in accordance with an example embodiment. The system 1600 may be contained in, for example, the confidential data frontend 104 or the confidential data backend 106 of FIG. 1.

The system 1600 may comprise a training component 1602 and a candidate processing component 1604. The training component 1602 feeds sample member profiles 1606A, sample member usage information 1606B, sample submission history table entries 1606C, and sample confidential data submission timestamps 1606D into a feature extractor 1608 that extracts one or more features 1610. The member profiles 1606A, sample member usage information 1606B, sample submission history table entries 1606C, and sample confidential data submission timestamps 1606D may be fed to the feature extractor 1608 in groupings pertaining to a sample submission by a sample user. Each of these groupings may also contain a label 1611 having a score indicating the likelihood that the user is permitted to make the corresponding confidential data submission at this time. The features 1610 are measurements useful in differentiating whether or not a user is permitted to make a confidential data submission, and may include the factors described above from the member profiles and member usage information, as well as the difference in times between the sample submission and the sample submission history table entries. A machine learning algorithm 1612 produces the member submission model 1614 using the extracted features 1610 along with the one or more labels. In the candidate processing component 1604, candidate member profiles 1616A, candidate member usage information 1616B, candidate submission history table entries 1616C, and a candidate confidential data timestamp 1616D are fed to a feature extractor 1618 that extracts one or more features 1620. In an example embodiment, features 1620 are identical to the features 1610, although the values for the features will of course vary. These features 1620 are then fed to the member submission model 1614, which outputs a member submission score 1622 indicating the likelihood that the user is permitted to make the confidential data submission at this time. The member submission score 1622 is then fed to a member submission classifier (not pictured) which outputs a decision as to whether or not the user is permitted to make a confidential data submission at this time based on the member submission score, such as by comparing the member submission score to a threshold. This threshold may either be fixed for all users, or may vary based on various factors involving the user (e.g., industry, title, location) or contextual factors.

It should be noted that the member submission model 1614 may be periodically updated via additional training and/or user feedback.

The machine learning algorithm 1612 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, a multi-class logistic regression model is used.

The training component 1602 may operate in an offline manner to train the member submission model 1614. The candidate processing component 1604, however, may be designed to operate in either an offline manner or an online manner.

Another issue that can arise is fraudulent or incorrect submitted confidential data values.

A measure can be made of the quality of the submitted confidential data values. In an example embodiment, this measurement is made as close to the time of submission as possible (i.e., in real-time or near-real-time). As will be seen, member profile features and behavioral features (e.g., usage information) may be used in calculating the quality of the submitted confidential data, and since this information can change over time, it is desirable that the measurement of quality of submitted confidential data be made as closely to the submission time as possible.

The quality score may then be associated with the confidential data values, and utilized later in the workflow when performing statistical analyses and/or providing insights based on the confidential data values.

In an example embodiment, a machine learning algorithm is utilized to train a model to generate a quality score for a submitted confidential data value. This model may utilize various behavioral and profile features for the member. One behavioral feature that can be utilized is the time taken to complete the submission process. For example, the submission process may include a survey asking a lot of different confidential questions, such as various types of compensation (e.g., salary, bonus, stock, etc.). If the member competes this process very quickly, there is an implication that the member may have been reckless with the data entry, such as by simply "clicking through" various screens quickly in the hopes of being presented with statistical insights from the confidential data from other members and not really caring whether his or her own submitted confidential data is accurate.

Another behavioral feature that can be utilized is time since the member created a member profile, or updated a member profile. The confidential data submitted is likelier to be more accurate the closer in time it was submitted to when a profile was created or updated. This is not just because active members of the social networking service are more reliable and thus likelier to submit accurate confidential data values, but also that if the profile is out of date the confidential data submitted might actually be inaccurate for the information the system has for the member. Thus, for example, the member may be accurately reporting their salary as $120,000, but the position for which the salary was submitted is gathered from a profile that is 5 years old and has never been updated and thus is less likely to be an accurate position for the member than if the member updated the profile in the last 3 months.

It should be noted that the opposite intuitions may also be true. A user who recently created a profile may actually be attempting to fraudulently create an account with which to enter false data. Likewise a user who recently updated a profile may be attempting to falsely modify the profile to be able to enter false data. One of the advantages of utilizing a machine learning model is that the model can be trained to recognize which aspects of the features contribute to the quality score and how, without relying on a human to make assumptions about what type of behavior may or may not adversely affect quality.

Another behavioral feature that can be utilized is how active a member is generally in the social networking service (e.g., page visits, numbers of communications sent, page updates, etc.). Members who are highly active are more likely to submit accurate confidential data values.

Another behavioral feature that can be utilized is how likely the member is to be looking for jobs. This may be derived, for example, based on job-search related activity, such as resume submissions and job posting searches conducted.

Other behavior features involve contextual information about how the confidential data was submitted, such as whether the member submitted the confidential data on a mobile device or desktop, the browser/operating system/platform utilized, etc.

One profile feature that may be utilized is how rich and complete the profile is, which may be deduced from a profile completion score indicating how much of a profile has been completed (i.e., how many fields in which profile data can be entered have actually been utilized).

Another profile feature that may be utilized is the function/industry of the member as listed in the member profile.

Another profile feature that may be utilized is the years of experience in the current function and/or overall in the workforce.

Figure 17:
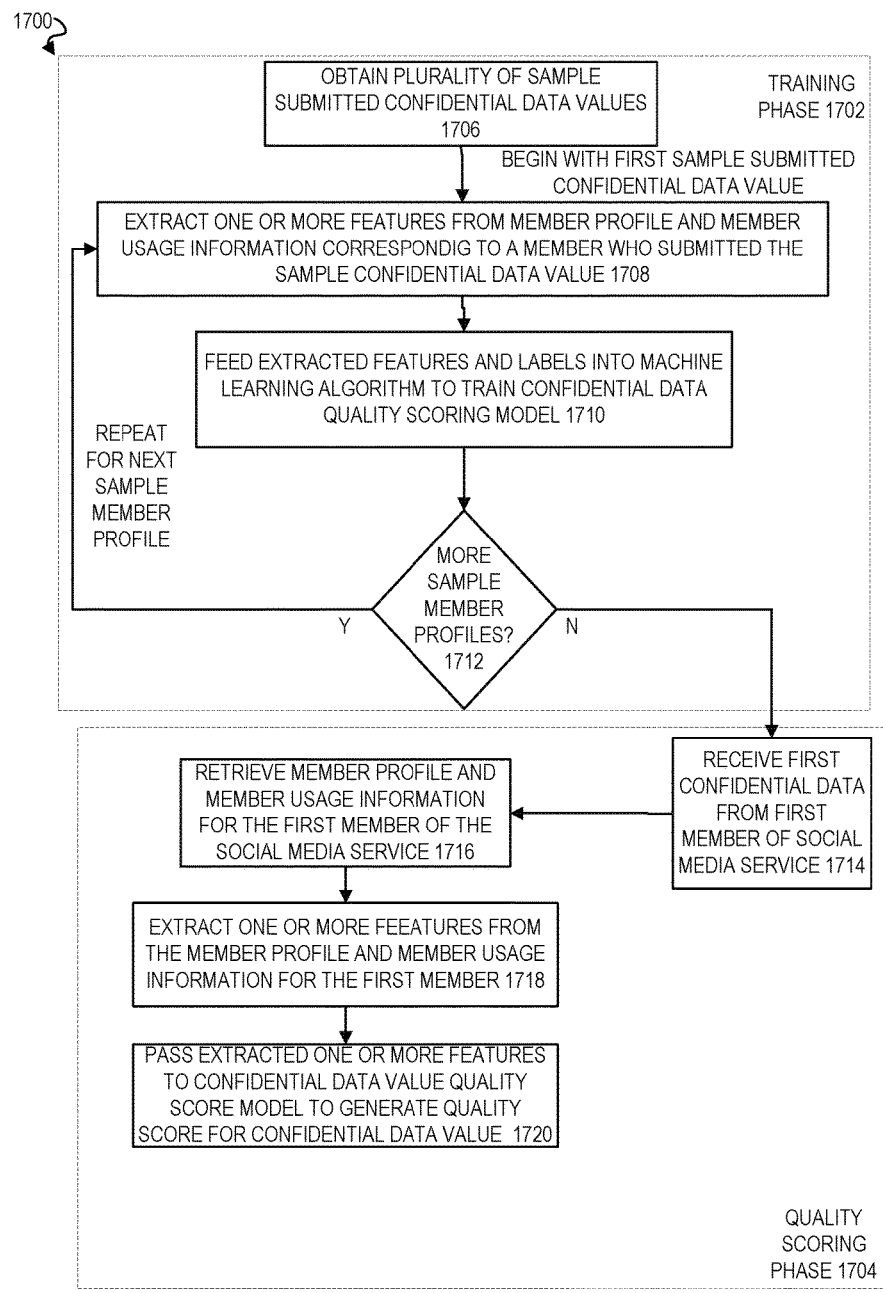
FIG. 17 is a flow diagram illustrating a method for protecting against incorrect confidential data values in a computer system, in accordance with an example embodiment.

FIG. 17 is a flow diagram illustrating a method 1700 for protecting against incorrect confidential data values in a computer system, in accordance with an example embodiment. The method 1700 may be broken into a training phase 1702 and a quality scoring phase 1704. In the training phase 1702, at operation 1706 a plurality of sample submitted confidential data values is obtained. A loop is then begun for each of the plurality of sample labeled submitted confidential data values. At operation 1708, one or more features are extracted from member profile and member usage information corresponding to a member of a social media service who submitted the sample confidential data value.

At operation 1710, the extracted one or more features are fed into a supervised machine learning algorithm to train a confidential data value quality score model based on the extracted one or more features.

At operation 1712, it is determined if there are any more sample submitted confidential data values.

In the quality scoring phase 1704, at operation 1714, first confidential data is received from a first member of the social media service. At operation 1716 member profile and member usage information is retrieved for the first member of the social media service. At operation 1718, the one or more features are extracted from the member profile and member usage information for the first member. At operation 1720, the extracted one or more features are passed from the member profile and member usage information for the first member to the confidential data value quality score model to generate a quality score for the confidential data value. While not depicted in this figure, the quality score may be used for various functions, such as removing the confidential data value submitted if the quality score is too low.

Figure 18:
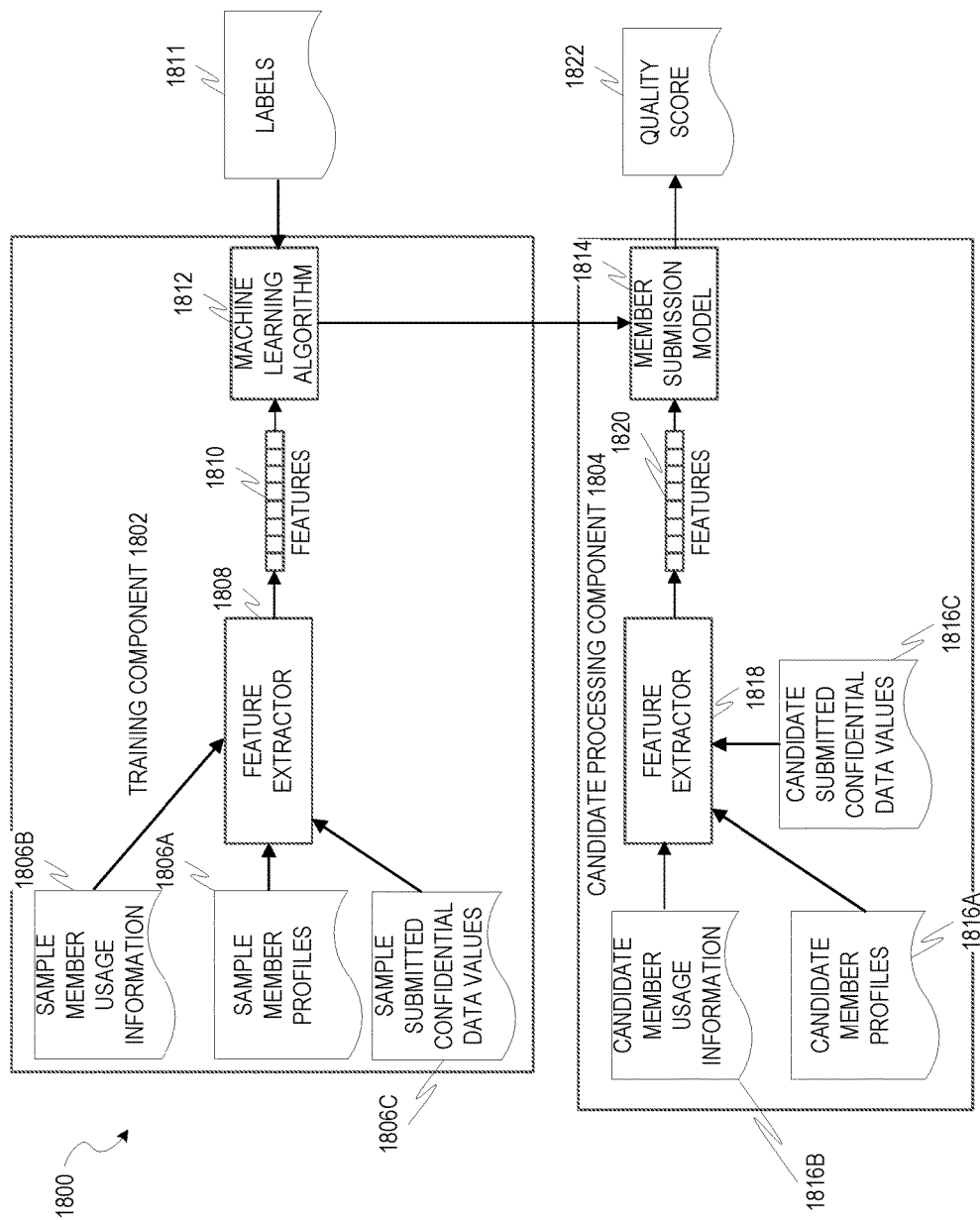
FIG. 18 is a block diagram illustrating a system for performing machine learning to train a member submission model in accordance with an example embodiment.

FIG. 18 is a block diagram illustrating a system 1800 for performing machine learning to train a member submission model in accordance with an example embodiment. The system 1800 may be contained in, for example, the confidential data frontend 104 or the confidential data backend 106 of FIG. 1, or may be contained in other components in FIG. 1.

The system 1800 may comprise a training component 1802 and a candidate processing component 1804. The training component 1802 feeds sample member profiles 1806A, sample member usage information 1806B, and sample submitted confidential data values 1806C, into a feature extractor 1808 that extracts one or more features 1810. The member profiles 1806A, sample member usage information 1806B, and sample submitted confidential data values 1806C may be fed to the feature extractor 1808 in groupings pertaining to a sample submission by a sample user. Labels 1811 for the sample submitted confidential data values 1806C may have a score indicating the quality of the confidential data submission. The features 1810 are measurements useful in differentiating quality of the confidential data submission, and may include the factors described above from the member profiles and member usage information. A machine learning algorithm 1812 produces the confidential data value quality score model 1814 using the extracted features 1810 along with the one or more labels 1811. In the candidate processing component 1804, candidate member profiles 1816A, candidate member usage information 1816B, and a candidate confidential data value submission 1816C are fed to a feature extractor 1818 that extracts one or more features 1820. In an example embodiment, features 1820 are identical to the features 1810, although the values for the features will of course vary. These features 1820 are then fed to the confidential data value quality score model 1814, which outputs a quality score 1822 indicating the quality of the confidential data submission.

It should be noted that the confidential data value quality score model 1814 may be periodically updated via additional training and/or user feedback.

The machine learning algorithm 1812 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, a multi-class logistic regression model is used.

The training component 1802 may operate in an offline manner to train the confidential data value quality score model 1814. The candidate processing component 1804, however, may be designed to operate in either an offline manner or an online manner.

In an example embodiment, the confidential data value quality score model 1814 may be a non-linear model. For example, logistic regression using bucketed features may be utilized. In another example embodiment, a regression tree may be utilized.

The training data may be gathered by looking at cohorts where a large number of submissions have been made. In such large cohorts, statistical methods can be used to determine which submissions are inside or outside of "good" ranges. Additionally, known ranges of confidential data values can be accessed. For example, in the case where the confidential data values are compensation values, certain data sources, such as the Bureau of Labor Statistics, publish compensation ranges that can be used to differentiate good entries and bad entries.

Figure 19A:
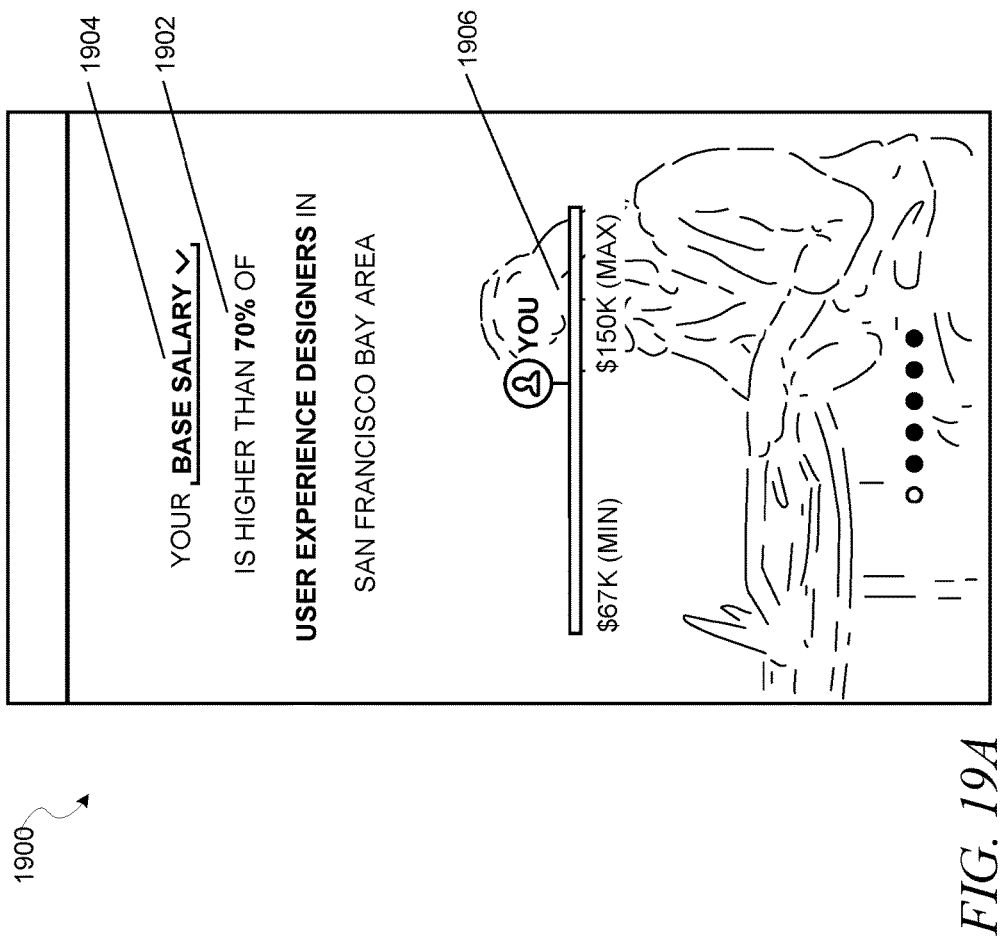
FIGS. 19A-19C are screen captures illustrating a user interface for displaying insights to a first user from confidential data submitted by other users, in accordance with an example embodiment.
Figure 19B:
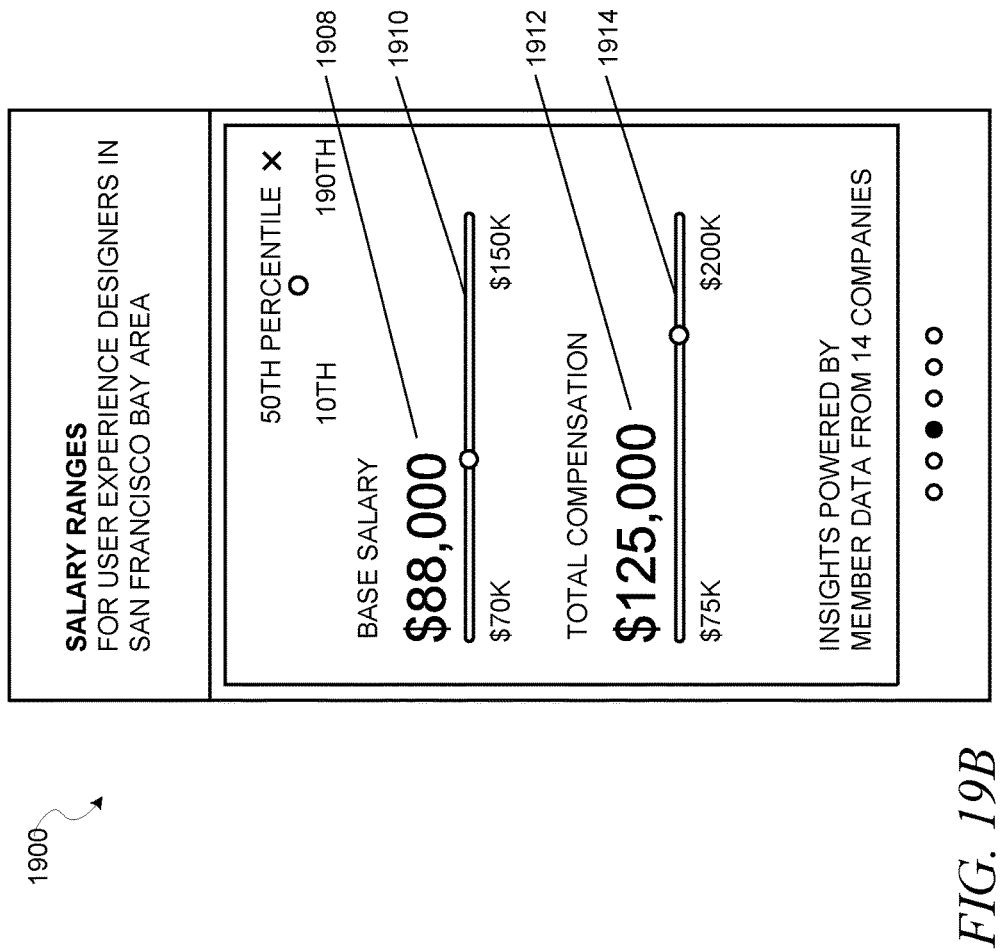
Figure 19C:
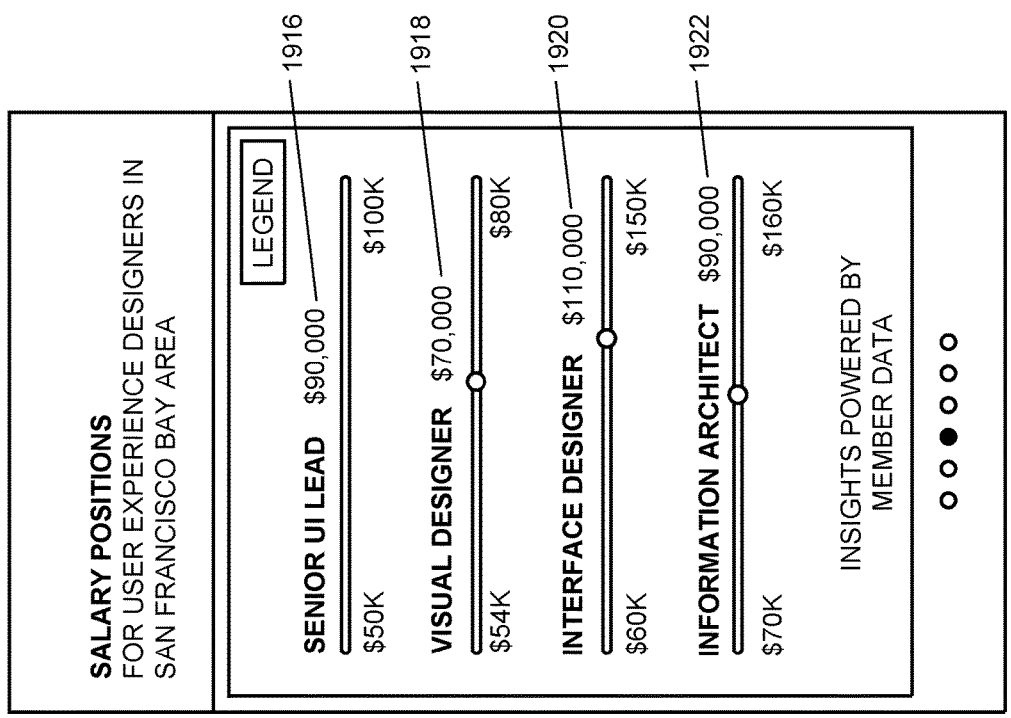

FIGS. 19A-19C are screen captures illustrating a user interface 1900 for displaying insights to a first user from confidential data submitted by other users, in accordance with an example embodiment. Referring first to FIG. 19A, the user interface 1900 displays a metric 1902 comparing confidential data of the first user to other users in a same slice as the first user. Here, for example, the first user is able to see that his base salary (as selectable via drop-down menu 1904) is higher than 70% of other users in the same slice (the slice being depicted as User Experience Designers in the San Francisco Bay Area). This metric is also displayed as a graphic 1906 for easy comparison.

Referring now to FIG. 19B, the user interface 1900 displays salary ranges for users in the same slice as the first user, including a median base salary 1908, a range of submitted base salaries 1910, median total compensation 1912, and a range of submitted total compensations 1914.

Referring now to FIG. 19C, the user interface 1900 displays insights 1916, 1918, 1920, and 1922 for related positions to the position of the first user. Notably, these insights 1916, 1918, 1920, and 1922 may require using information from slices other than the one the first user belongs to. In an example embodiment, there is no limitation on the confidential data frontend 104 retrieving insights from the confidential data insights data store 122 that come from slices different than ones to which the user being presented with the data insights belongs, although in some example embodiments, the confidential data front end 104 may itself wish to limit the first user's ability to ask for and/or view certain types of information (e.g., the confidential data front end 104 may permit the first user to view salary information for positions related to the first user's own position, but not unrelated positions).

As depicted above, all of the insights may be statistical information derived from confidential data submitted by users other than the user viewing the insights (as well as potentially including the user's own confidential data as well).

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-19C are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 20:
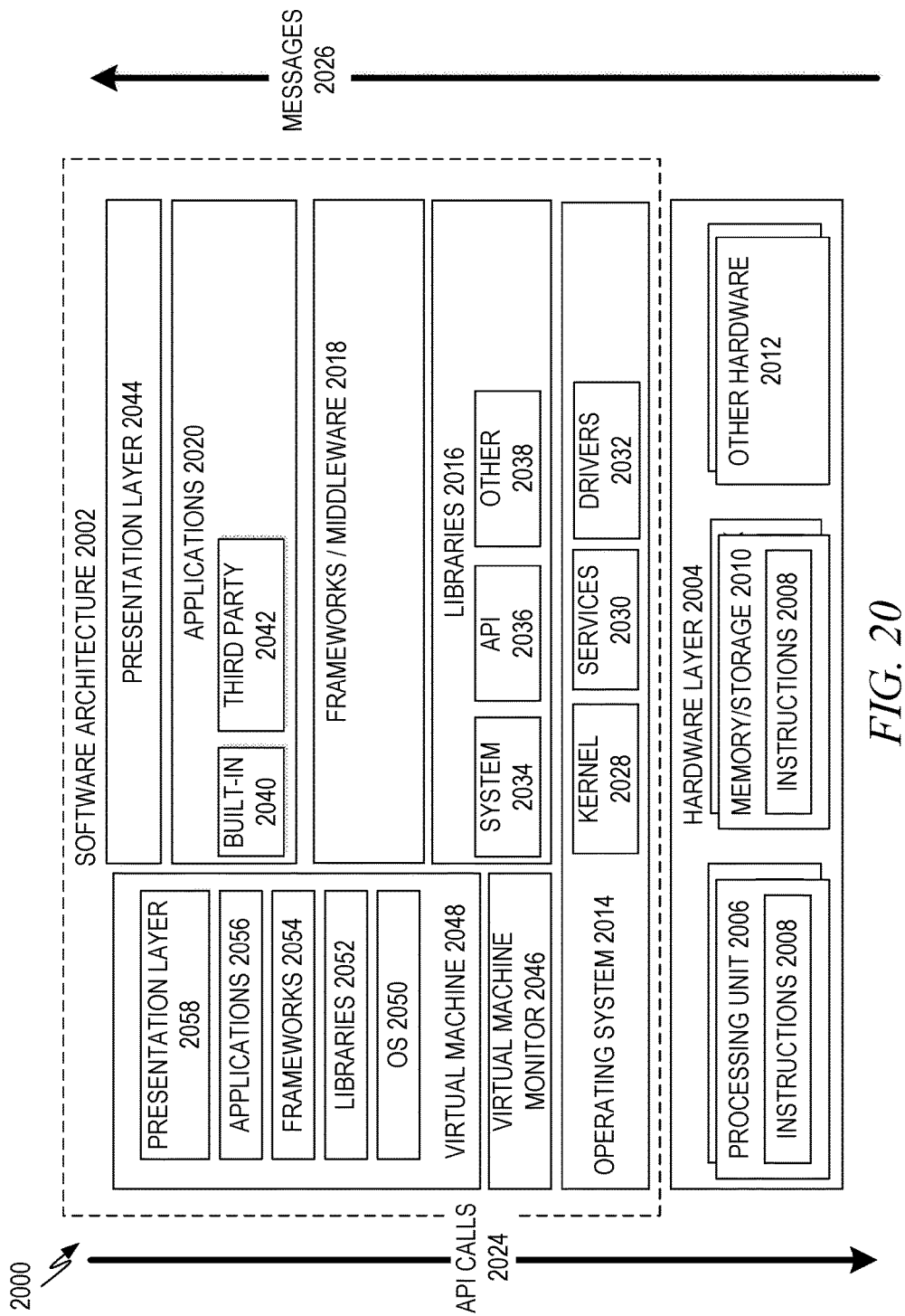
FIG. 20 is a block diagram illustrating a representative software architecture, which may be used in conjunction with various hardware architectures herein described.

FIG. 19 is a block diagram 2000 illustrating a representative software architecture 2002, which may be used in conjunction with various hardware architectures herein described. FIG. 20 is merely a non-limiting example of a software architecture, and it will be appreciated that many other architectures may be implemented to facilitate the functionality described herein. The software architecture 2002 may be executing on hardware such as a machine 2100 of FIG. 21 that includes, among other things, processors 2110, memory/storage 2130, and I/O components 2150. A representative hardware layer 2004 is illustrated and can represent, for example, the machine 2100 of FIG. 21. The representative hardware layer 2004 comprises one or more processing units 2006 having associated executable instructions 2008. The executable instructions 2008 represent the executable instructions of the software architecture 2002, including implementation of the methods, modules, and so forth of FIGS. 1-19C. The hardware layer 2004 also includes memory and/or storage modules 2010, which also have the executable instructions 2008. The hardware layer 2004 may also comprise other hardware 2012, which represents any other hardware of the hardware layer 2004, such as the other hardware illustrated as part of the machine 2100.

In the example architecture of FIG. 20, the software architecture 2002 may be conceptualized as a stack of layers where each layer provides particular functionality. For example, the software architecture 2002 may include layers such as an operating system 2014, libraries 2016, frameworks/middleware 2018, applications 2020, and a presentation layer 2044. Operationally, the applications 2020 and/or other components within the layers may invoke API calls 2024 through the software stack and receive responses, returned values, and so forth, illustrated as messages 2026, in response to the API calls 2024. The layers illustrated are representative in nature and not all software architectures have all layers. For example, some mobile or special purpose operating systems may not provide a layer of frameworks/middleware 2018, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than by interfacing directly with the underlying operating system 2014 functionality (e.g., kernel 2028, services 2030, and/or drivers 2032). The libraries 2016 may include system libraries 2034 (e.g., C standard library) that may provide functions such as memory allocation functions, string manipulation functions, mathematical functions, and the like. In addition, the libraries 2016 may include API libraries 2036 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks 2018 (also sometimes referred to as middleware) may provide a higher-level common infrastructure that may be utilized by the applications 2020 and/or other software components/modules. For example, the frameworks 2018 may provide various graphic user interface (GUI) functions, high-level resource management, high-level location services, and so forth. The frameworks 2018 may provide a broad spectrum of other APIs that may be utilized by the applications 2020 and/or other software components/modules, some of which may be specific to a particular operating system or platform.

The applications 2020 include built-in applications 2040 and/or third party applications 2042. Examples of representative built-in applications 2040 may include, but are not limited to, a contacts application, a browser application, a book reader application, a location application, a media application, a messaging application, and/or a game application. The third party applications 2042 may include any of the built-in applications 2040 as well as a broad assortment of other applications. In a specific example, the third party application 2042 (e.g., an application developed using the Android™ or iOS™ software development kit (SDK) by an entity other than the vendor of the particular platform) may be mobile software running on a mobile operating system such as iOS™, Android™ Windows® Phone, or other mobile operating systems. In this example, the third party application 2042 may invoke the API calls 2024 provided by the mobile operating system such as the operating system 2014 to facilitate functionality described herein.

The applications 2020 may utilize built-in operating system 2014 functions (e.g., kernel 2028, services 2030, and/or drivers 2032), libraries 2016 (e.g., system libraries 2034, API libraries 2036, and other libraries 2038), and frameworks/middleware 2018 to create user interfaces to interact with users of the system. Alternatively, or additionally, in some systems, interactions with a user may occur through a presentation layer, such as the presentation layer 2044. In these systems, the application/module "logic" can be separated from the aspects of the application/module that interact with a user.

Some software architectures utilize virtual machines. In the example of FIG. 20, this is illustrated by a virtual machine 2048. A virtual machine creates a software environment where applications/modules can execute as if they were executing on a hardware machine (such as the machine 2100 of FIG. 21, for example). A virtual machine is hosted by a host operating system (e.g., operating system 2014 in FIG. 20) and typically, although not always, has a virtual machine monitor 2046, which manages the operation of the virtual machine 2048 as well as the interface with the host operating system (e.g., operating system 2014). A software architecture executes within the virtual machine 2048, such as an operating system 2050, libraries 2052, frameworks/middleware 2054, applications 2056, and/or a presentation layer 2058. These layers of software architecture executing within the virtual machine 2048 can be the same as corresponding layers previously described or may be different.

Example Machine Architecture and Machine-Readable Medium

Figure 21:
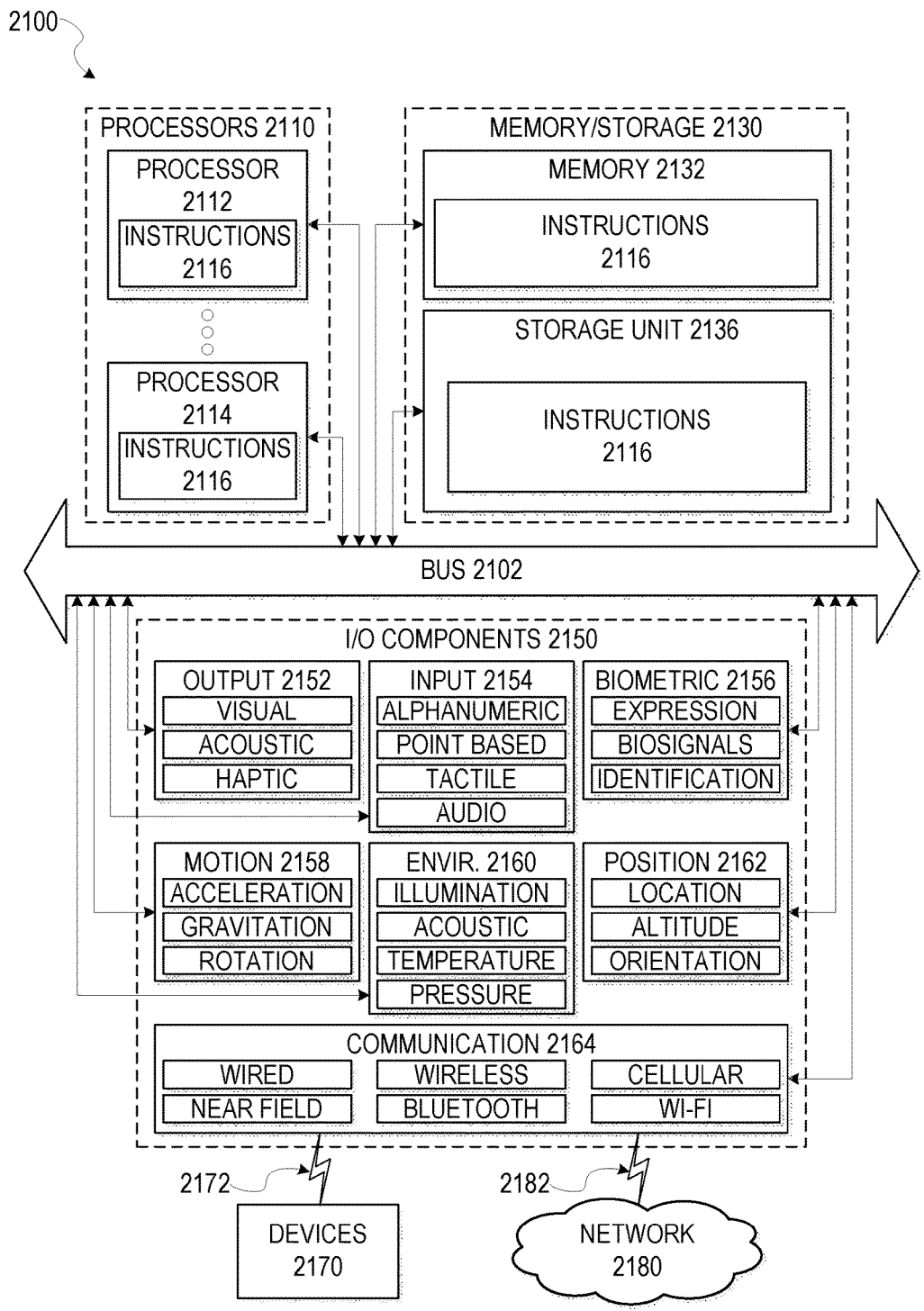
FIG. 21 is a block diagram illustrating components of a machine, according to some example embodiments, able to read instructions from a machine-readable medium (e.g., a machine-readable storage medium) and perform any one or more of the methodologies discussed herein.

FIG. 21 is a block diagram illustrating components of a machine 2100, according to some example embodiments, able to read instructions from a machine-readable medium (e.g., a machine-readable storage medium) and perform any one or more of the methodologies discussed herein. Specifically, FIG. 21 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed. The instructions transform the general, non-programmed machine into a particular machine programmed to carry out the described and illustrated functions in the manner described. In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2116, sequentially or otherwise, that specify actions to be taken by the machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory/storage 2130, and I/O components 2150, which may be configured to communicate with each other such as via a bus 2102. In an example embodiment, the processors 2110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 2112 and a processor 2114 that may execute the instructions 2116. The term "processor" is intended to include multi-core processors that may comprise two or more independent processors (sometimes referred to as "cores") that may execute instructions 2116 contemporaneously. Although FIG. 21 shows multiple processors 2110, the machine 2100 may include a single processor with a single core, a single processor with multiple cores (e.g., a multi-core processor), multiple processors with a single core, multiple processors with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116 embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of the processors 2110 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 2116. The term "machine-readable medium" shall also be taken to include any medium, or combination of multiple media, that is capable of storing instructions (e.g., instructions 2116) for execution by a machine (e.g., machine 2100), such that the instructions, when executed by one or more processors of the machine (e.g., processors 2110), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine will depend on the type of machine. For example, portable machines such as mobile phones will likely include a touch input device or other such input mechanisms, while a headless server machine will likely not include such a touch input device. It will be appreciated that the I/O components 2150 may include many other components that are not shown in FIG. 21. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162, among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 2162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via a coupling 2182 and a coupling 2172, respectively. For example, the communication components 2164 may include a network interface component or other suitable device to interface with the network 2180. In further examples, the communication components 2164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2170 may be another machine or any of a wide variety of peripheral devices (e.g., a peripheral device coupled via a USB).

Moreover, the communication components 2164 may detect identifiers or include components operable to detect identifiers. For example, the communication components 2164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 2180 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or another type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., HTTP). Similarly, the instructions 2116 may be transmitted or received using a transmission medium via the coupling 2172 (e.g., a peer-to-peer coupling) to the devices 2170. The term "transmission medium" shall be taken to include any intangible medium that is capable of storing, encoding, or carrying the instructions 2116 for execution by the machine 2100, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computerized method for protecting against oversubmission of confidential data values in a computer system, the method comprising:
    maintaining a submission history table by tracking an identification of each user making a submission of a confidential data value and a timestamp of when the corresponding submission was made;

receiving a first confidential data value submission from a user having a first identification;

retrieving member usage information for the user having the first identification, based on the first identification, the member usage information comprising tracked interactions between the user and the computer system;

referencing the submission history table to determine a length of time since the user having the first identification last made a submission of confidential data;

determining that the user having the first identification is not permitted to submit confidential information based on the member usage information and the length of time since the user having the first identification last made a submission of confidential data, wherein the determining includes passing a member profile, member usage information, and entries in the submission history table for the user having the first identification to a member submission model trained by a machine learning algorithm to extract features from the member profile and the member usage information and make a determination that the user having the first identification is not permitted to submit confidential information based on the features and the length of time since the user having the first identification last made a submission of confidential data; and in response to the determining, discarding the first confidential data value.

2. The method of claim 1, wherein the features include how recently the member profile has been update.

3. The method of claim 1, wherein the features include a degree in which the member profile was last updated.

4. The method of claim 1, wherein the determining is based on an industry in which the user having the first identification works, as described in a member profile.

5. The method of claim 1, wherein the determining is based on a job function of the user having the first identification, as described in a member profile.

6. The method of claim 1, wherein the length of time since the user having the first identification last made a submission of confidential data is compared to a frequency that varies based on industry in which the user having the first identification works.

7. A system comprising:

a computer-readable medium having instructions stored there on, which, when executed by a processor, cause the system to:

maintain a submission history table by tracking an identification of each user making a submission of a confidential data value and a timestamp of when the corresponding submission was made;

receive a first confidential data value submission from a user having a first identification;

retrieve member usage information for the user having the first identification, based on the first identification, the member usage information comprising tracked interactions between the user and the computer system;

reference the submission history table to determine a length of time since the user having the first identification last made a submission of confidential data;

determine that the user having the first identification is not permitted to submit confidential information based on the member usage information and the length of time since the user having the first identification last made a submission of confidential data, wherein the determining includes passing a member profile, member usage information, and entries in the submission history table for the user having the first identification to a member submission model trained by a machine learning algorithm to extract features from the member profile and the member usage information and make a determination that the user having the first identification is not permitted to submit confidential information based on the features and the length of time since the user having the first identification last made a submission of confidential data; and in response to the determining, discard the first confidential data value.

8. The system of claim 7, wherein the features include how recently the member profile has been update.

9. The system of claim 7, wherein the features include a degree in which the member profile was last updated.

10. The system of claim 7, wherein the determining is based on an industry in which the user having the first identification works, as described in a member profile.

11. The system of claim 7, wherein the determining is based on a job function of the user having the first identification, as described in a member profile.

12. The system of claim 6, wherein the length of time since the user having the first identification last made a submission of confidential data is compared to a frequency that varies based on industry in which the user having the first identification works.

13. A non-transitory machine-readable storage medium comprising instructions, which when implemented by one or more machines, cause the one or more machines to perform operations comprising:

maintaining a submission history table by tracking an identification of each user making a submission of a confidential data value and a timestamp of when the corresponding submission was made;

receiving a first confidential data value submission from a user having a first identification;

retrieving member usage information for the user having the first identification, based on the first identification, the member usage information comprising tracked interactions between the user and the computer system;

referencing the submission history table to determine a length of time since the user having the first identification last made a submission of confidential data;

determining that the user having the first identification is not permitted to submit confidential information based on the member usage information and the length of time since the user having the first identification last made a submission of confidential data, wherein the determining includes passing a member profile, member usage information, and entries in the submission history table for the user having the first identification to a member submission model trained by a machine learning algorithm to extract features from the member profile and the member usage information and make a determination that the user having the first identification is not permitted to submit confidential information based on the features and the length of time since the user having the first identification last made a submission of confidential data; and in response to the determining, discarding the first confidential data value.

14. The non-transitory machine-readable storage medium of claim 13, wherein the features include how recently the member profile has been update.

15. The non-transitory machine-readable storage medium of claim 13, wherein the features include a degree in which the member profile was last updated.

16. The non-transitory machine-readable storage medium of claim 13, wherein the determining is based on an industry in which the user having the first identification works, as described in a member profile.

17. The non-transitory machine-readable storage medium of claim 13, wherein the determining is based on a job function of the user having the first identification, as described in a member profile.

\* \* \* \* \*

UNITED STATES PATENT AND TRADEMARK OFFICE
CERTIFICATE OF CORRECTION

PATENT NO.        : 10,158,645 B1
APPLICATION NO.   : 15/224261
DATED             : December 18, 2018
INVENTOR(S)       : Kenthapadi et al.

Page 1 of 1

It is certified that error appears in the above-identified patent and that said Letters Patent is hereby corrected as shown below:

In the Claims

In Column 32, Line 22, in Claim 12, delete "claim 6," and insert --claim 7,-- therefor Signed and Sealed this
Tenth Day of March, 2020

Andrei Iancu
*Director of the United States Patent and Trademark Office*